United States Patent
Lundberg et al.

(10) Patent No.: US 11,789,160 B2
(45) Date of Patent: Oct. 17, 2023

(54) CARRY-ON GPS SPOOFING DETECTOR

(71) Applicant: The MITRE Corporation, McLean, VA (US)

(72) Inventors: Erik T. Lundberg, Cambridge, MA (US); Hugo F. Trappe, Medford, MA (US); Christian P D Minor, Bedford, MA (US); David Long, Xenia, OH (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 17/412,925

(22) Filed: Aug. 26, 2021

(65) Prior Publication Data

US 2023/0067192 A1      Mar. 2, 2023

(51) Int. Cl.
*G01S 19/21* (2010.01)
*G01S 19/29* (2010.01)

(52) U.S. Cl.
CPC ............ *G01S 19/215* (2013.01); *G01S 19/29* (2013.01)

(58) Field of Classification Search
CPC ................................ G01S 19/215; G01S 19/29
See application file for complete search history.

(56) References Cited

U.S. PATENT DOCUMENTS

| | | | |
|---|---|---|---|
| 5,296,861 A * | 3/1994 | Knight | G01S 3/46 342/357.38 |
| 5,949,381 A * | 9/1999 | Saitoh | H01Q 1/1271 343/713 |
| 7,760,139 B1 * | 7/2010 | Gorski-Popiel | G01S 19/37 342/357.77 |
| 9,753,143 B2 | 9/2017 | Bianchi et al. | |
| 9,971,037 B2 * | 5/2018 | Dickman | G01S 19/23 |
| 10,024,973 B1 | 7/2018 | Alexander et al. | |
| 10,705,221 B2 | 7/2020 | Raab et al. | |
| 11,079,493 B2 * | 8/2021 | Jaeckle | G01S 19/21 |

(Continued)

FOREIGN PATENT DOCUMENTS

| CN | 111505669 A | 8/2020 |
|---|---|---|
| WO | 2020/086137 A1 | 4/2020 |

OTHER PUBLICATIONS

Kaplan, Elliott D. et. al., "Understanding GPS Principles and Applications", Artech House, 2nd ed., 2006 (Year: 2006) (Year: 2006).*

(Continued)

*Primary Examiner* — Cassi J Galt
(74) *Attorney, Agent, or Firm* — MORRISON & FOERSTER LLP

(57) ABSTRACT

Examples in accordance with this disclosure provide a system for detecting a spoofed signal, the spoofed signal comprising position-navigation-timing (PNT) data. The system can include a first antenna and a second antenna, both configured to receive one or more first signals from one or more navigation satellites. The first antenna and second antenna can be configured to be separated by a first distance. The system can include a first receiver coupled to the first antenna and a second receiver coupled to the second antenna, where each antenna is configured to receive one or more signals from the respective antenna. Each of the first receiver and the second receiver are configured to extract a respective carrier phase data.

31 Claims, 11 Drawing Sheets

(56) References Cited

U.S. PATENT DOCUMENTS

| | | | |
|---|---|---|---|
| 2009/0121932 A1* | 5/2009 | Whitehead | G01S 19/36 |
| | | | 342/357.36 |
| 2013/0060955 A1* | 3/2013 | Enge | H04W 12/12 |
| | | | 709/229 |
| 2015/0226858 A1* | 8/2015 | Leibner | H04K 3/90 |
| | | | 342/357.59 |
| 2019/0235086 A1* | 8/2019 | Meng | H04K 3/90 |
| 2020/0371247 A1 | 11/2020 | Marmet | |

OTHER PUBLICATIONS

Arafin et al. (May 2017). "A Low-Cost GPS Spoofing Detector Desgin for Internet of Things (IoT) Applications" GLSVLSI '17 May 10-12, 2017 Banff, AB, Canada; 6 pages.

Calvo-Palomino et al. (2020). "LSTM-based GNSS Spoofing Detection Using Low-cost Spectrum Sensors" IEEE. 4 pages.

Hegarty et al. (2019). "Spoofing Detection for Airborne GNSS Equipment" Research Gate. (20 pages).

* cited by examiner

CARRY-ON GPS SPOOFING DETECTOR

STATEMENT REGARDING FEDERALLY-SPONSORED RESEARCH

This invention was made with government support under FA8702-20-C-0001 awarded by the Air Force Cyber Resiliency Office for Weapon. The government has certain rights in the invention.

FIELD OF THE DISCLOSURE

This disclosure relates to a system and method for detecting GPS spoofing signals. The system and method may relate to a portable GPS spoofing detector that can operate independently from a navigation system of a vessel, e.g., an aircraft, ship, vehicle.

BACKGROUND OF THE DISCLOSURE

The Global Positioning System (GPS) was first launched in the 1970s as a constellation of satellites for transmitting signals providing position, navigation, and timing information for receivers that were configured to receive transmission from the constellation of satellites. Using the constellation of satellites, the exact position of an object on earth could be determined to a high degree of accuracy. The use of GPS has since become ubiquitous to navigation systems, including, but not limited to aircraft, ships, vehicles, and ground troop movements. For instance, many aircraft navigation systems rely on GPS to derive Position, Navigation, and Timing (PNT) information for navigation and basic operation.

GPS satellites are also a part of a broader satellite navigation system, the Global Navigation Satellite System (GNSS). GNSS can be used to describe satellite navigation systems, including GPS, that can provide geo-spatial positioning around the globe. GNSS includes multiple satellite systems, including, e.g. the GPS, GLONASS, Galileo, Beidou and other regional systems. Some satellite navigation systems, e.g., satellite navigation receivers, can rely on satellites from one or more GNSSs to provide positional data. Reliance on satellites from one or more GNSSs can provide accurate and redundant signals that are readily available. For example, if a satellite were to fail or a line of sight between a receiver and a satellite were obstructed, the receiver can receive signals from other systems. To the extent that the terms GPS and GNSS are used throughout this disclosure, a skilled artisan will understand that examples described herein can apply to either and/or both GPS and GNSS unless otherwise indicated.

The rise in the use of GPS has been accompanied by the creation and rise of GPS spoofing. GPS spoofing occurs when a malicious actor attempts to emulate an authentic GPS signal (i.e., a signal from one of the satellites in the GPS constellation). For instance, GPS spoofing devices can broadcast false signals that cause a victim receiver, e.g., an aircraft, to calculate false position, velocity, and/or time information. In other words, GPS spoofing can lead the receiver to inaccurately determine its position with respect to the earth. As an example, a malicious actor may attempt to spoof, e.g., send false GPS signals to, an unmanned aerial vehicle (UAV) that is performing surveillance in order to, for example, make the UAV land so that it can no longer collect surveillance images and data. The signals sent by the GPS spoofing device may attempt to mislead the UAV to determine that it is located within a geo-fencing boundary. Based on this false position, the UAV may determine that it is in a restricted area and undertake emergency action such as landing. Other spoofing devices may transmit a signal that transmits an incorrect time stamp, which can affect downstream systems in the aircraft or other vehicle relying on the GPS for synchronization.

Some aircraft may have built-in resiliency capabilities to GPS spoofing, e.g., based on antenna type and location. However, such systems that include receivers with built in spoofing detection and defenses are still rare and may be costly and time consuming to integrate into aircraft navigation and avionics systems. Further, many spoofing detectors are bulky, costly, and not easily transported from one vessel to another. For example, some spoofing detectors require that antennas be mounted to an outside of the aircraft. Because some aircraft may allow operators to take actions related to tactics, techniques, and procedures when incorrect information, e.g., spoofed GPS signals are either received by the GPS receiver and/or GPS data are not available, pilots may benefit from accurate indications that spoofing is occurring while not requiring their aircraft or devices be equipped with bulky and expensive equipment.

SUMMARY OF THE DISCLOSURE

Described herein are systems and methods for detecting GPS spoofing signals. In one or more examples a system for detecting GPS spoofing signals can include at least two antennas, each coupled to a receiver, and one or more processors coupled to the receivers. In one or more examples, the system can identify whether a received signal was sent from a satellite or a GPS spoofing device. For instance, in one or more examples, the system can receive signals from one or more GPS satellites and/or a GPS spoofing device. In order to determine whether the received signals are from a GPS spoofing device, in one or more examples, the system can process the signals to determine a distance between the two antennas. If the relative position is below a predetermined threshold, an alert can be generated to inform a user that the signals received by the system may be from a GPS spoofing device. To the extent that the examples are described with respect to GPS, the examples provided below could be applied to any GNSS.

In one or more examples, the system can identify whether a received signal was sent from a satellite or a GPS spoofing device according to a second process. For instance, in one or more examples, the system can predict a range of realistic behavior of the vessel, e.g., aircraft, ship, vehicle, etc. based on empirical information and compare these predictions to received signal data. For instance, in one or more examples, the system can receive signals from one or more satellites and/or a GPS spoofing device and the system can determine a position, velocity, time (PVT) measurement based on the received signals. In one or more examples, the PVT measurements can be used to determine a signal-based behavior. In one or more examples, the signal-based behavior can be compared to an expected behavior of the vessel. In one or more examples, the expected behavior can include one or more of an expected change in position, an expected change in altitude, an expected change in velocity, an expected time interval, an expected time consistency, an expected clock rate bias, an expected path, and an expected level of accuracy. The expected behavior of the vessel can be determined based on empirical data. If the PVT measurements differ from the expected behavior by a predetermined threshold, one or more of the received signals may be from a spoofing device.

In one or more examples, the system can identify whether a received signal was sent from a satellite or a GPS spoofing device according to a third process. In one or more examples, the system can check the incoming data for errors that can potentially be indicative of spoofed signals. For instance, the system can receive signals from one or more satellites and/or a GPS spoofing device. In one or more examples, the system can compare the one or more signals against a list of allowed values. In one or more examples, the list of allowed values can refer to values and/or behaviors of acceptable input values. If the signals to do not match the list of allowed values, an alert can be generated to inform a user that one or more of the signals received by the device may be from a GPS spoofing device. In one or more examples, the processes for identifying a spoofed GPS signal can run in parallel and/or be combined to add an additional layer of scrutiny to the signals received by the device.

One or more examples in accordance with this disclosure can provide a system for detecting a spoofed signal, with the spoofed signal comprising position-navigation-timing (PNT) data. The system can include a first antenna configured to receive one or more first signals from one or more navigation satellites, a second antenna configured to receive one or more second signals from the one or more navigation satellites, wherein the second antenna is separated from the first antenna by a first distance, a first receiver coupled to the first antenna, wherein the first receiver is configured to receive the one or more first signals from the first antenna and wherein the first receiver is configured to extract a first carrier phase data, a second receiver coupled to the second antenna, wherein the second receiver is configured to receive the one or more second signals from the second antenna and wherein the second receiver is configured to extract a second carrier phase data, a memory, and one or more processors coupled to the first receiver and the second receiver. In one or more examples, the memory stores one or more programs that when executed by the one or more processors, cause the one or more processors to determine a presence of a spoofed signal among the one or more first signals and the one or more second signals, where the presence is determined based on the first carrier phase data, the second carrier phase data, and the first distance between the first antenna and the second antenna.

In one or more examples, determining the presence of a spoofed signal by the system can include generating a carrier phase differential data based on the first carrier phase data and the second carrier phase data, comparing the carrier phase differential data to a pre-determined threshold, and determining that the carrier phase differential data is less than the pre-determined threshold. In one or more examples, generating the carrier phase differential data can include extracting a third carrier phase data with the first receiver based on the one or more first signals, extracting a fourth carrier phase data with the second receiver based on the one or more second signals, determining a first difference between the first carrier phase data and the third carrier phase data, determining a second difference between the second carrier phase data and the fourth carrier phase data, and determining a double difference between the first difference and the second difference, where the double difference corresponds to the carrier phase differential data.

In one or more examples, the processor of the system may be caused to send an alert to an external computing device. In one or more examples the processor of the system may be caused to extract position-velocity-time (PVT) data from at least one of the one or more first signals or the one or more second signals and determine a presence of a spoofed signal among the at least one of the one or more first signals and the one or more second signals, based on the extracted PVT data. In one or more examples, wherein confirming the presence of a spoofed signal can include determining a signal-based behavior of the system based on the PVT data, comparing the signal-based behavior of the system to an expected behavior of the system, and determining that the signal-based behavior differs from the expected behavior by a pre-determined threshold.

In one or more examples, the expected behavior can include at least one selected from an expected change in position, an expected change in altitude, an expected change in velocity, an expected time interval, an expected time consistency, an expected clock rate bias, an expected path, and an expected level of accuracy. In one or more examples, the expected behavior can be based on empirical data comprising one or more selected from a historical trajectory of a vessel carrying the system, the physical capabilities of the vessel, the timing characteristics of the system; the timing characteristics of the one or more navigation satellites, and the historical accuracies of calculations made by and values received by the system.

In one or more examples, the process or the system can be caused to synchronize one or more data frames from at least one of the one or more first signals or the one or more second signals, compare the one or more data frames to a list of allowed values, and confirm a spoofed signal among the at least one of the one or more first signals and the one or more second signals, based on the comparison. In one or more examples, the list of allowed values can comprise a list of pre-determined, acceptable input values. In one or more examples, the list of allowed values can be generated based on one or more of publicly available validity checks, statistical behavior of historical messages, rules to detect specific spoofing threats, or other data reasonableness checks, including prior knowledge of system design.

In one or more examples, the first antenna and the second antenna of the first system can be configured to be mounted to a window on the interior of the aircraft or vehicle. In one or more examples, the system can include a housing, wherein the housing is configured to enclose the first and second receivers, a first grounding plane, wherein the first grounding plane is disposed between the first antenna and an outer surface of the housing, and a second grounding plane, wherein the second grounding plane is disposed between the second antenna and the outer surface of the housing. In one or more examples, the housing is configured to be portable, such that the housing can fit on a seat of a vessel. In one or more examples, the first distance may be in a range of about 6-15 inches. In one or more examples, the first receiver and the second receiver can comprise GNSS receivers.

One or more examples in accordance with this disclosure can provide a method for detecting a spoofed signal, the spoofed signal comprising position-navigation-timing (PNT) data. The method can include receiving one or more first signals from one or more navigation satellites at a first antenna, receiving one or more second signals from the one or more navigation satellites at a second antenna, wherein the second antenna is separated from the first antenna by a first distance, receiving the one or more first signals at a first receiver coupled to the first antenna, wherein the first receiver is configured to extract a first carrier phase data from the one or more first signals, receiving the one or more second signals at a second receiver coupled to the second antenna, wherein the second receiver is configured to extract a second carrier phase data from the one or more second signals, determining a presence of a spoofed signal among the one or more first signals and the one or more second signals, wherein the presence is determined based on the first carrier phase data, the second carrier phase data, and the first distance between the first antenna and the second antenna.

In one or more examples, determining the presence of a spoofed signal can include generating a carrier phase differential data based on the first carrier phase data and the second carrier phase data, comparing the carrier phase differential data to a pre-determined threshold, and determining that the carrier phase differential data is less than the pre-determined threshold. In one or more examples, generating the carrier phase differential data can include extracting a third carrier phase data with the first receiver based on the one or more first signals, extracting a fourth carrier phase data with the second receiver based the on one or more second signals, determining a first difference between the first carrier phase data and the third carrier phase data, determining a second difference between the second carrier phase data and the fourth carrier phase data, determining a double difference between the first difference and the second difference, wherein the double difference corresponds to the carrier phase differential data.

In one or more examples, the method can include sending an alert to an external computing device, a command and control system, or a human-computer interface, such as a graphical user interface (GUI). In one or more examples, the method can include extracting position-velocity-time (PVT) data from at least one of the one or more first signals or the one or more second signals, and determining a presence of a spoofed signal among the at least one of the one or more first signals and the one or more second signals, based on the extracted PVT data.

In one or more examples, the method can include determining a signal-based behavior of the system based on the PVT data, comparing the signal-based behavior of the system to an expected behavior of the system, and determining that the signal-based behavior differs from the expected behavior by a pre-determined threshold. In some embodiments, the signal-based behavior may be greater that the pre-determined threshold. In some embodiments, the signal-based behavior may be less than the pre-determined threshold. In one or more examples, the expected behavior can include at least one selected from an expected change in position, an expected change in altitude, an expected change in velocity, an expected time interval, an expected time consistency, an expected clock rate bias, an expected path, and an expected level of accuracy. In one or more examples, the expected behavior can be based on empirical data comprising one or more selected from a historical trajectory of a vessel carrying the system, the physical capabilities of the vessel, the timing characteristics of the system; the timing characteristics of the one or more navigation satellites, and the historical accuracies of calculations made by and values received by the system.

In one or more examples, the method can include synchronizing one or more data frames from at least one of the one or more first signals or the one or more second signals, comparing the one or more data frames to a list of allowed values, and confirming a presence of a spoofed signal among the at least one of the one or more first signals and the one or more second signals, based on the comparison. In one or more examples, the list of allowed values can include a list of pre-determined, acceptable input values. In one or more examples, the list of allowed values can be generated based on one or more of publicly available validity checks, statistical behavior of historical messages, rules to detect specific spoofing threats, or data reasonableness checks, including prior knowledge of system design.

In one or more examples, the method can include mounting the first antenna and the second antenna to a window on the interior of the aircraft or vehicle.

One or more examples in accordance with this disclosure can provide a non-transitory computer readable storage medium storing one or more programs for detecting a spoofed signal, the spoofed signal comprising position-navigation-timing (PNT) data, for execution by one or more processors of an electronic device that when executed by the device can cause the device to receive one or more first signals from one or more navigation satellites at a first antenna, receive one or more second signals from the one or more navigation satellites at a second antenna, wherein the second antenna is separated from the first antenna by a first distance, receive the one or more first signals at a first receiver coupled to the first antenna, wherein the first receiver is configured to extract a first carrier phase data from the one or more first signals, receive the one or more second signals at a second receiver coupled to the second antenna, wherein the second receiver is configured to extract a second carrier phase data from the one or more second signals, and determine a presence of a spoofed signal among the one or more first signals and the one or more second signals, wherein the presence is determined based on the first carrier phase data, second carrier phase data, and the first distance between the first antenna and the second antenna.

In one or more examples, the presence of a spoofed signal can include generating a carrier phase differential data based on the first carrier phase data and the second carrier phase data, comparing the carrier phase differential data to a pre-determined threshold, and determining that the carrier phase differential data are less than the pre-determined threshold. In one or more examples, can include extracting a third carrier phase data with the first receiver based on the one or more first signals, extracting a fourth carrier phase data with the second receiver based on the one or more second signals, determining a first difference between the first carrier phase data and the third carrier phase data, determining a second difference between the second carrier phase data and the fourth carrier phase data, and determining a double difference between the first difference and the second difference, wherein the double difference corresponds to the carrier phase differential data.

In one or more examples, the non-transitory computer readable storage medium can be caused to send an alert to an external computing device. In one or more examples, the non-transitory computer readable storage medium can be caused to extract position-velocity-time (PVT) data from at least one of the one or more first signals or the one or more second signals, and determine a presence of a spoofed signal among the at least one of the one or more first signals and the one or more second signals, based on the extracted PVT data.

In one or more examples, confirming the presence of a spoofed signal can include determining a signal-based behavior of the system based on the PVT data, comparing the signal-based behavior of the system to an expected behavior of the system, and determining that the signal-based behavior differs from the expected behavior by a pre-determined threshold. In some embodiments, the signal-based behavior may be greater that the pre-determined threshold. In some embodiments, the signal-based behavior may be less than the pre-determined threshold. In one or more examples, the expected behavior can include at least one selected from an expected change in position, an expected change in altitude, an expected change in velocity, an expected time interval, an expected time consistency, an expected clock rate bias, an expected path, and an expected level of accuracy. In one or more examples, the expected behavior is based on empirical data comprising one or more selected from a historical trajectory of a vessel carrying the system, the physical capabilities of the vessel, the timing characteristics of the system; the timing characteristics of the one or more navigation satellites, and the historical accuracies of calculations made by and values received by the system.

In one or more examples, the non-transitory computer readable storage medium can be caused to synchronize one or more data frames from at least one of the one or more first signals or the one or more second signals, and compare the one or more data frames to a list of allowed values, and confirm a presence of a spoofed signal among the at least one of the one or more first signals and the one or more second signals, based on the comparison. In one or more examples, the list of allowed values can include a list of pre-determined, acceptable input values. In one or more examples, the list of allowed values can be generated based on one or more of publicly available validity checks, statistical behavior of historical messages, rules to detect specific spoofing threats, and other data reasonableness checks, including prior knowledge of system design.

It will be appreciated that any of the variations, aspects, features and options described in view of the systems apply equally to the methods and vice versa. It will also be clear that any one or more of the above variations, aspects, features and options can be combined.

BRIEF DESCRIPTION OF THE FIGURES

The invention will now be described, by way of example only, with reference to the accompanying drawings, in which.

DETAILED DESCRIPTION OF THE DISCLOSURE

Figure 1:
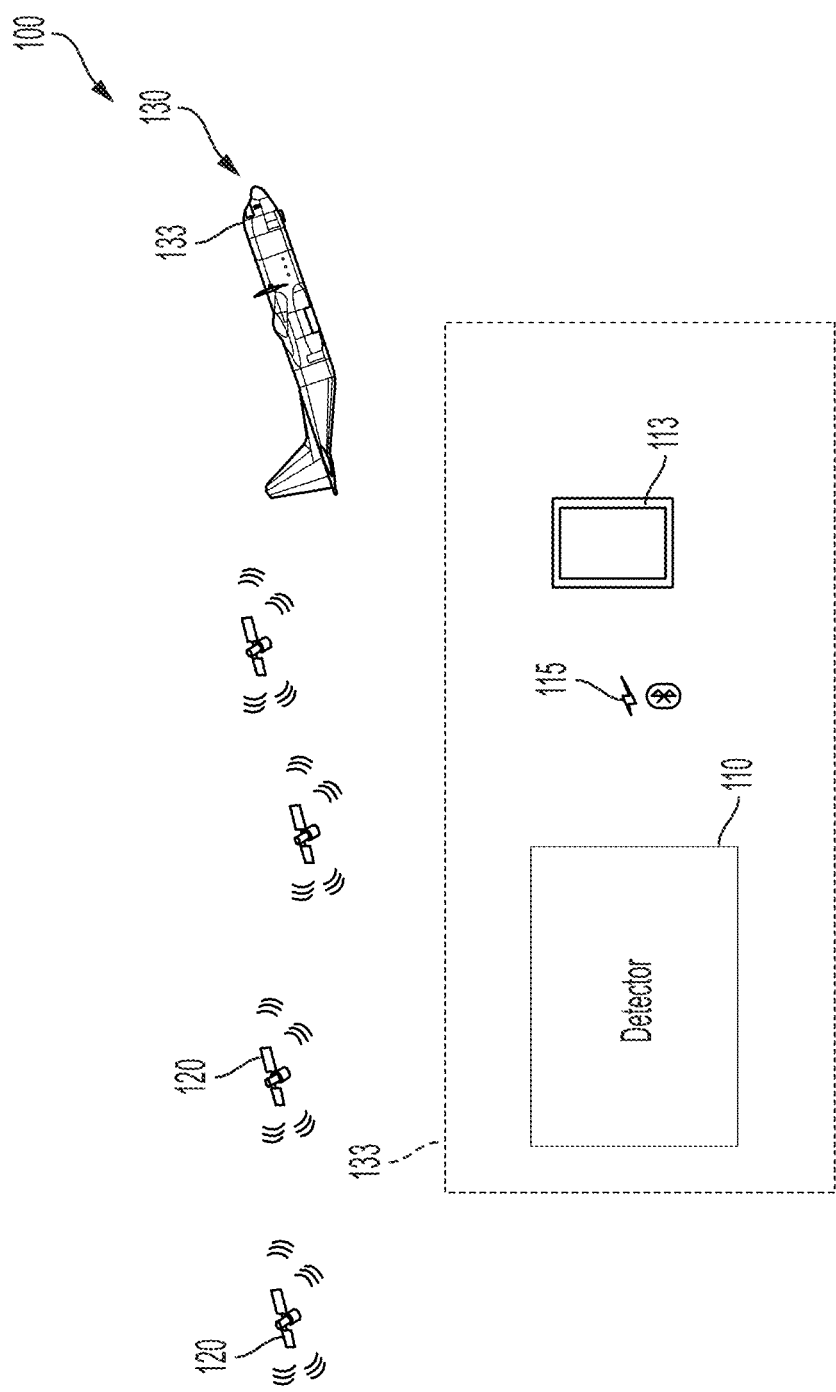
FIG. 1 illustrates an exemplary GPS spoofing detection system according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for detecting GPS spoofing signals. In one or more examples a device for detecting GPS spoofing signals can include at least two antennas, each coupled to a receiver, and a processor coupled to the receivers. In one or more examples, the device can include a housing that encloses one or more of the electronic components. In one or more examples, the at least two antennas can be mounted to a surface of the housing. In one or more examples, the housing can be sized to be easily carried aboard an aircraft or other vessel.

In one or more examples, the device can identify whether a received signal was sent from one or more satellites or a GPS spoofing device. In one or more examples, the device can receive signals from one or more satellites and/or a GPS spoofing device. In one or more examples, each of the at least two antennas can receive corresponding signals. In order to determine whether the received signals are from a GPS spoofing device, in one or more examples, the device can process the signals to determine a relative position between the at least two antennas. In one or more examples, the relative position between two antennas can refer to a distance between the two antennas. If the relative position is below a predetermined threshold, an alert can be generated to inform a user that one or more of the signals received by the device may be from a GPS spoofing device.

In one or more examples, the device can identify whether a received signal was sent from a satellite or a GPS spoofing device according to a second process. In one or more examples, the device can predict the behavior of the vessel, e.g., aircraft, ship, vehicle, etc. based on empirical information and compare these predictions to data received. For instance, in one or more examples, the device can receive signals from one or more satellites and/or a GPS spoofing device. In one or more examples, the device can determine a position, velocity, time (PVT) measurement based on the signals. In one or more examples, the PVT measurements can be used to determine a positional behavior of the vessel based on signal derived PVT measurements. In one or more examples, the signal-based behavior can be compared to an expected behavior of the vessel. In one or more examples, the expected behavior can include one or more of an expected change in position, an expected change in altitude, an expected change in velocity, an expected time interval, an expected time consistency, an expected clock rate bias, an expected track or path, and an expected level of accuracy. The expected behavior of the vessel can be determined based on empirical data. If the PVT measurements differ from the expected behavior by a predetermined threshold, an alert can be generated to inform a user that one or more of the signals received by the device may be from a GPS spoofing device.

In one or more examples, the device can identify whether a received signal was sent from a satellite or a GPS spoofing device according to a third process. In one or more examples, the device can check the incoming data for errors that can potentially be indicative of spoofed signals. For instance, the device can receive signals from one or more satellites and/or a GPS spoofing device. In one or more examples, the device can compare the one or more signals against a list of allowed values and/or allow list. In one or more examples, the list of allowed values or allow list can refer to values and/or behaviors of acceptable input values. If the signals to do not match the list of allowed values, an alert can be generated to inform a user that one or more of the signals received by the device may be from a GPS spoofing device. In one or more examples, the processes for identifying a spoofed GPS signal can run in parallel and/or be combined to add an additional layer of scrutiny to the signals received by the device.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. To the extent that specific devices, apparatuses are described as including one or more modules and/or algorithms described with respect to one or more examples of this disclosure, the architecture of the methods, devices, and systems described herein are not limited to these specific configurations. For example, various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

The use of GPS and other GNSS such as Galileo, GLONASS, and Beidou has become ubiquitous in navigation systems, appearing everywhere from aircraft, ships, vehicles, to cell phones and other portable devices. The rise in the use of GPS has been accompanied by the creation and rise of GPS spoofing. GPS spoofing occurs when a malicious actor attempts to emulate an authentic GPS signal and/or navigational signal sent by a navigational satellite. For instance, GPS spoofing devices can broadcast false signals that cause a victim receiver, e.g., aircraft, to produce false position, velocity, and/or time information. Based on this false position, the victim receiver may perform unnecessary, and sometimes dangerous, actions. Some vessels, e.g., aircraft, can have built-in resiliency capabilities to GPS spoofing, e.g., based on antenna type and location. Many spoofing detectors can be bulky, costly, and not easily transported from one aircraft to another. For example, some spoofing detectors require that antennas be mounted to an outside of the vessel. Because some aircraft may allow operators to take actions related to tactics, techniques, and procedures when incorrect information, e.g., spoofed signals, are received by the receiver, operators may benefit from accurate indications that spoofing is occurring.

FIG. 1 illustrates an exemplary GPS spoofing detection system according to examples of the disclosure. In one or more examples, the exemplary GPS spoofing system 100 depicted in FIG. 1 can include a spoofing detector 110. In one or more examples, the spoofing detector 110 can receive one or more signals transmitted by a plurality of satellites 120. The signals may include position, navigation, and timing (PNT) information. In one or more example, the spoofing detector 110 can receive false signals transmitted by one or more spoofing devices (not shown), where the false signals may include one or more false position, navigation, and timing (PNT) information. The spoofing detector 110 may be able to use one or more processes to determine whether the received signals correspond to one or more of the plurality of satellites 120 or the spoofing device.

In one or more examples, the spoofing detector 110 can be a portable device that may be easily carried on and off an aircraft 130. In one or more examples, the spoofing detector 110 can be placed in a cockpit 133 of an aircraft 130 during operation. For instance, the spoofing detector 110 can be placed on a seat and/or surface in the cockpit 133. For example, the detector can be placed on a seat or surface in the cockpit. In one or more examples, the detector 110 can be positioned near a window such that the detector can receive signals from one or more satellites 120 and/or a GPS spoofer (not shown) via an unobstructed view of the window. While the examples discussed in this disclosure may refer to using the detector 110 on aircraft, this is not intended to be limiting. For instance, in one or more examples, the spoofing detector 110 may be used on a variety of transportation modes, including but not limited to ships, vehicles, and ground troop movements.

In one or more examples, the detector 110 can be in communication with a computer display system 113. For instance, once the detector 110 determines that it has received one or more false signals, e.g., from a GPS spoofing device, the detector 110 can send an alert to the computer display system 113 via connection 115. In one or more examples, the connection 115 can be a wireless connection, e.g., via Bluetooth and/or wired connection. In some embodiments, the computer display system 113 can be an electronic flight bag (EFB). As used herein, an EFB may refer to a portable computing device (e.g., an electronic tablet, laptop, or the like) that can include data (e.g., technical orders, checklists) used by the pilots to perform various flight management tasks. In one or more examples, the computer display system 113 can be a device other than an EFB. In one or more examples, the EFB may not be connected to the avionic system of the aircraft 130.

Figure 2:
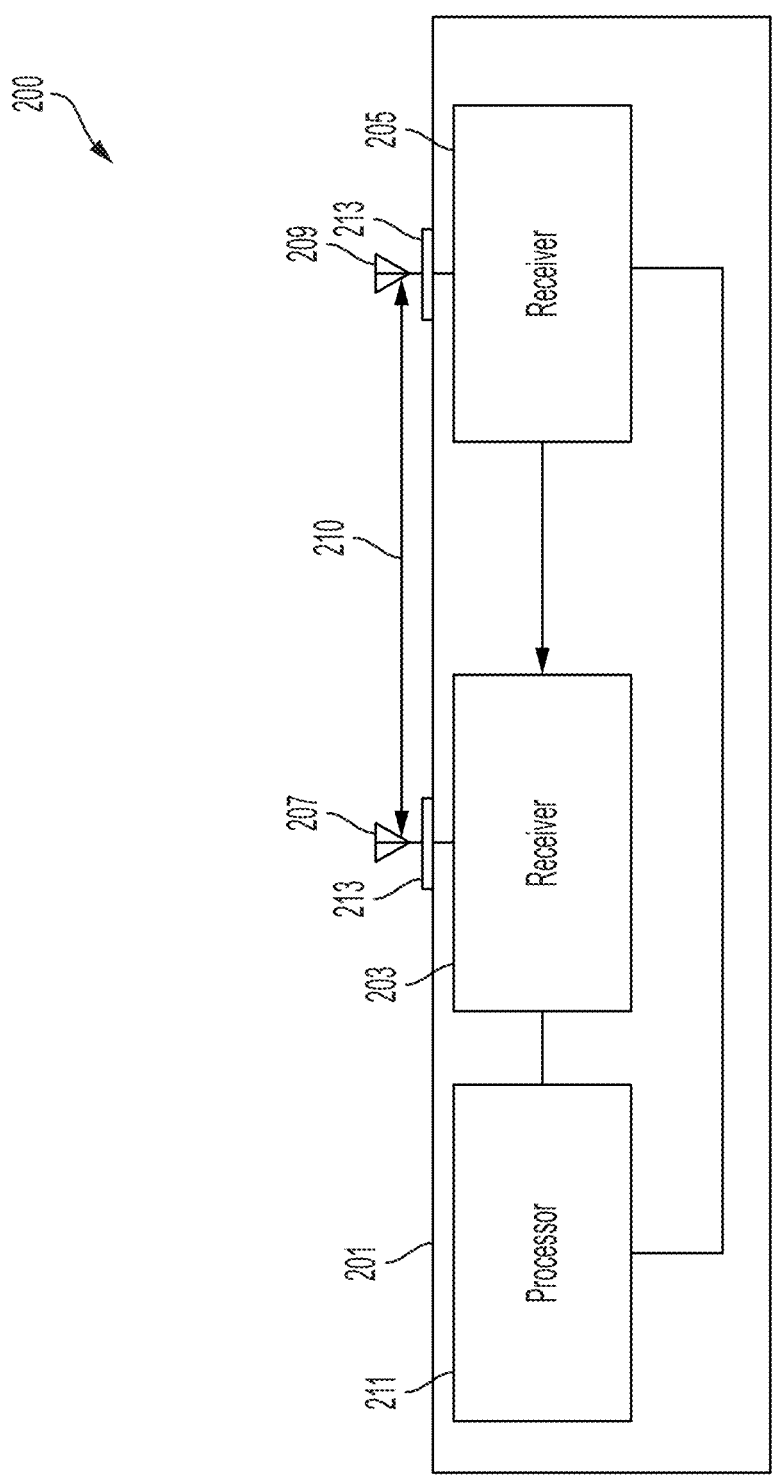
FIG. 2 illustrates an exemplary GPS spoofing detector according to examples of the disclosure.

FIG. 2 illustrates a block diagram of an exemplary GPS spoofing detector according to examples of the disclosure. The example of FIG. 2 can illustrate an exemplary implementation for the GPS spoofing detector 110 of FIG. 1. In one or more examples, the detector 200 depicted in FIG. 2 can include at least two antennas 207, 209, at least two receivers 203, 205, a processor 211, and a housing 201. In one or more examples, the housing 201 can enclose one or more of the electronic components of the detector 200. In one or more examples, the housing 201 can be a portable housing that can easily be carried on and off an aircraft and/or vessel.

In one or more examples, as depicted in FIG. 2, the detector 200 can include a first antenna and a second antenna configured to receive signals transmitted by one or more satellites. The first antenna 207 and the second antenna 209 can be mounted to an outer surface of the housing 201. Each of the antennas 207 and 209 can be configured to receive GPS or other navigation signals transmitted by positional satellite networks. In one or more examples, the first antenna 207 and the second antenna 209 can be separated by a fixed distance 210. As will be discussed in further detail below, the fixed distance 210 between the antennas can play a role in determining whether a received signal is a legitimate signal or a spoofed signal. In one or more examples, the fixed distance 210 can be in the range of 6-10 in. However, this example should not be seen as limiting and the antennas may be separated by any suitable distance, such that the antennas can be mounted on the outer surface of the housing 201. In one or more examples, the antennas can be mounted to the inside of a window, e.g., window of a cockpit. For example, each of the antennas can be coupled to a mount, such as a suction cup, adhesive mount, or magnetic mount.

In one or more examples, a ground plane 213 can be disposed under each antenna 207, 209. For instance, a ground plane may 213 be disposed on an outer surface of the housing 201, at the location where the antenna 207, 209 is mounted to the housing 201. In one or more examples, each antenna 207, 209 can have a corresponding ground plane 213. For instance, the first antenna 207 may have a corresponding first ground plane 213 disposed where the first antenna 207 is mounted to the housing 201. The second antenna 209 may have a corresponding second ground plane 213 disposed where the second antenna 209 is mounted to the housing 201. The ground plane 213 can be provided to mitigate electrical interference and/or noise from electromagnetic waves that might be in the cockpit from other devices. In one or more examples, the ground planes 213 can improve the accuracy of calculations performed by the detector 200.

As shown in FIG. 2, the detector 200 can include a first receiver 203 and a second receiver 205 disposed in the housing 201. In one or more examples, the first receiver 203 and second receiver 205 can be a GNSS receiver and/or a GPS receiver. For instance, in one or more examples, both the first receiver 203 and the second receiver 205 can be GNSS receivers. In one or more examples, both the first receiver 203 and the second receiver 205 can be GPS receivers. In one or more examples, the first receiver 203 can be a GNSS receiver and the second receiver 205 can be a GPS receiver. To the extent this disclosure references either a GPS or GNSS receiver, a skilled artisan will understand that either a GPS or GNSS receiver can be used without departing from the scope of this disclosure. In one or more examples, a first antenna 207 can be coupled to a first receiver 203, such that signals received by the first antenna 207 can be transmitted to the first receiver 203. In one or more examples, a second antenna 209 can be coupled to a second receiver 205, such that signals received by the second antenna 209 can be transmitted to the second receiver 205.

In one or more examples, the first receiver 203 may be a rover-functioning receiver while the second receiver 205 can be a base-functioning receiver. In such examples, the base-functioning receiver (e.g., second receiver 205) can be configured to determine a correction factor and satellite system, e.g., GPS and/or GNSS, signal measurements based on one or more satellite signals (e.g., data received by the second antenna 209 and transmitted to the second receiver 205). In one or more examples, either the first or second receiver can be configured to be either the rover-functioning receiver or base-functioning receiver. The satellite system signal measurements include carrier phase, pseudorange, Doppler frequency, data-bits, and signal strength on one or more receiving center frequencies. The correction factor can be used to provide a more accurate position determination based on the received signals. In one or more examples, the correction factor can also be used to calculate the distance between the antennas.

For example, base-functioning receiver (e.g., the second receiver 205) can receive one or more satellite signals and determine a correction factor based on the received satellite signals via the second antenna 209. In one or more examples, the correction factor can be applied by the base-functioning receiver to correct the location indicated by the one or more received satellite signals indicate. In one or more examples, the correction factor can be sent by the base-functioning receiver (e.g., the second receiver 205) to the rover-functioning receiver (e.g., the first receiver 203). The rover-functioning receiver can then apply the correction factor to data received from the first antenna 207 corresponding to one or more satellite signals.

In one or more examples, the first receiver 203 and a second receiver 205 can be separately coupled to the processor 211. In one or more examples, the processor 211 depicted in FIG. 2 can be enclosed in the housing 201 of the detector 200. In one or more examples, the processor 211 can be located external to and separate from the housing 201 of the detector. In one or more examples, first receiver 203 and a second receiver 205 can be coupled to one or more processors including, but not limited to processor 211. In one or more examples, the processors can be used to determine whether one or more signals received by the first antenna 207 and the second antenna, 209 are spoofed. In one or more examples, the processors can send an alert to one or more external devices, e.g., an electronic flight bag, if it is determined that one or more spoofed signals are received.

Thus, in one or more examples, a detector, e.g., detector 110, can be used to determine if signals from a GPS spoofing device are being received. In one or more examples, the detector may be positioned in a cockpit of an aircraft. In one or more examples, the detector can be positioned in a vessel that uses GPS as a part of its navigational system. To the extent that the examples are described with respect to GPS, the examples could be applied to a GNSS format.

Figure 3A:
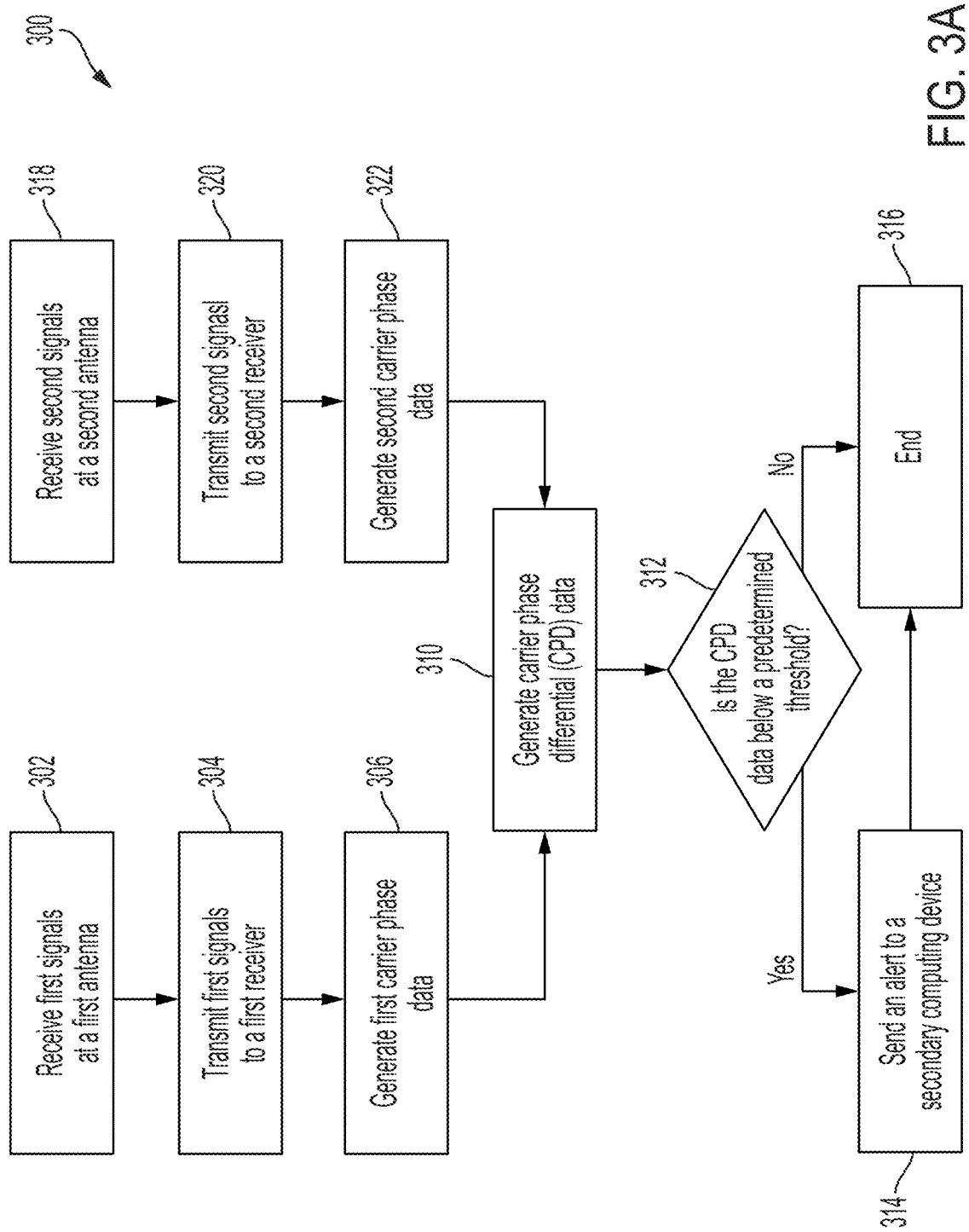
FIG. 3A illustrates an exemplary GPS spoofing detection process according to examples of the disclosure.

FIG. 3A illustrates an exemplary spoofing detection process according to examples of the disclosure. In one or more examples, one or more steps of process 300 can be implemented on a GPS spoofing detection system such as the one depicted at 110 of FIG. 1 and system 200 of FIG. 2. In one or more examples of the disclosure, the process 300 depicted in FIG. 3A can begin at step 302 wherein the detector can receive one or more signals at a first antenna. For instance, the first antenna can receive one or more first signals corresponding to one or more satellites and/or a GPS spoofing device. In one or more examples, at step 318, the detector can receive one or more signals at a second antenna, which can occur at or around the same time as step 302. For instance, the second antenna can receive one or more second signals corresponding to one or more satellites and/or a GPS spoofing device. In one or more examples, the one or more second signals may correspond to the one or more first signals. For example, due to the offset distance, e.g., fixed distance 210, between the first antenna and the second antenna, the one or more first signals may be different from the one or more second signals. For example, there may be a slight time delay between receipt of the one or more first signals and the one or more second signals and/or the distance between the first antenna and the one or more satellites may be slightly different between the distance between the second antenna and the one or more satellites.

In one or more examples, after receiving the one or more first signals at step 302 the process can move to step 304 wherein the one or more first signals are transmitted to a first receiver. In one or more examples, after receiving the one or more second signals at step 318, the process 300 can move to step 320 wherein the one or more second signals are communicated to a second receiver. For instance, the one or more first signals can be transmitted via a wired connection to a corresponding receiver. In one or more examples, the one or more first signals can be wirelessly transmitted, e.g., via Bluetooth. In one or more examples, steps 304 and 320 can be performed simultaneously. For instance, in one or more examples, the first antenna and the second antenna can be synchronized by their respective receivers. The synchronized antennas may be configured to transmit the respective signals to the corresponding receivers at the same time. In one or more examples, steps 304 and 320 can be performed near the same time. In one or more examples, the steps 304 and 320 can be performed at different times.

In one or more examples, the one or more first signals can correspond to the one or more second signals. For example, due to the offset distance, e.g., fixed distance 210, between the first antenna and the second antenna, the one or more first signals may be different from the one or more second signals. For example, there may be a slight time delay between receipt of the one or more first signals and the one or more second signals and/or the distance between the first antenna and the one or more satellites may be slightly different between the distance between the second antenna and the one or more satellites.

In one or more examples, after the first signal is transmitted at step 304, the process 300 can move to step 306 wherein one or more first carrier phase data can be extracted at the first receiver based on the transmitted one or more first signals. Carrier phase data (i.e., the phase of the carrier wave in a GPS satellite signal) can be used by a receiver to estimate the distance between the transmitting satellite and the receiver. In one or more examples, each of the one or more first GPS signals can have a corresponding first carrier phase data. In one or more examples, after the second signal is transmitted at step 320, the process 300 can move to step 322 wherein one or more second carrier phase data can be generated. The one or more second carrier phase data can be generated based on the transmitted one or more second signals. In one or more examples, each of the one or more second signals can have a corresponding second carrier phase data. For instance, the second carrier phase data can correspond to the apparent distance between the second receiver and a satellite (e.g., the satellite that sent the corresponding first GPS signal). In one or more examples, steps 306 and 322 can be performed simultaneously. For instance, in one or more examples, the first receiver and the second receiver can be synchronized to generate respective first and second carrier data at the same time. In one or more examples, steps 306 and 322 can be performed at or near the same time. In one or more examples, the steps 306 and 322 can be performed at different times.

Figure 3B:
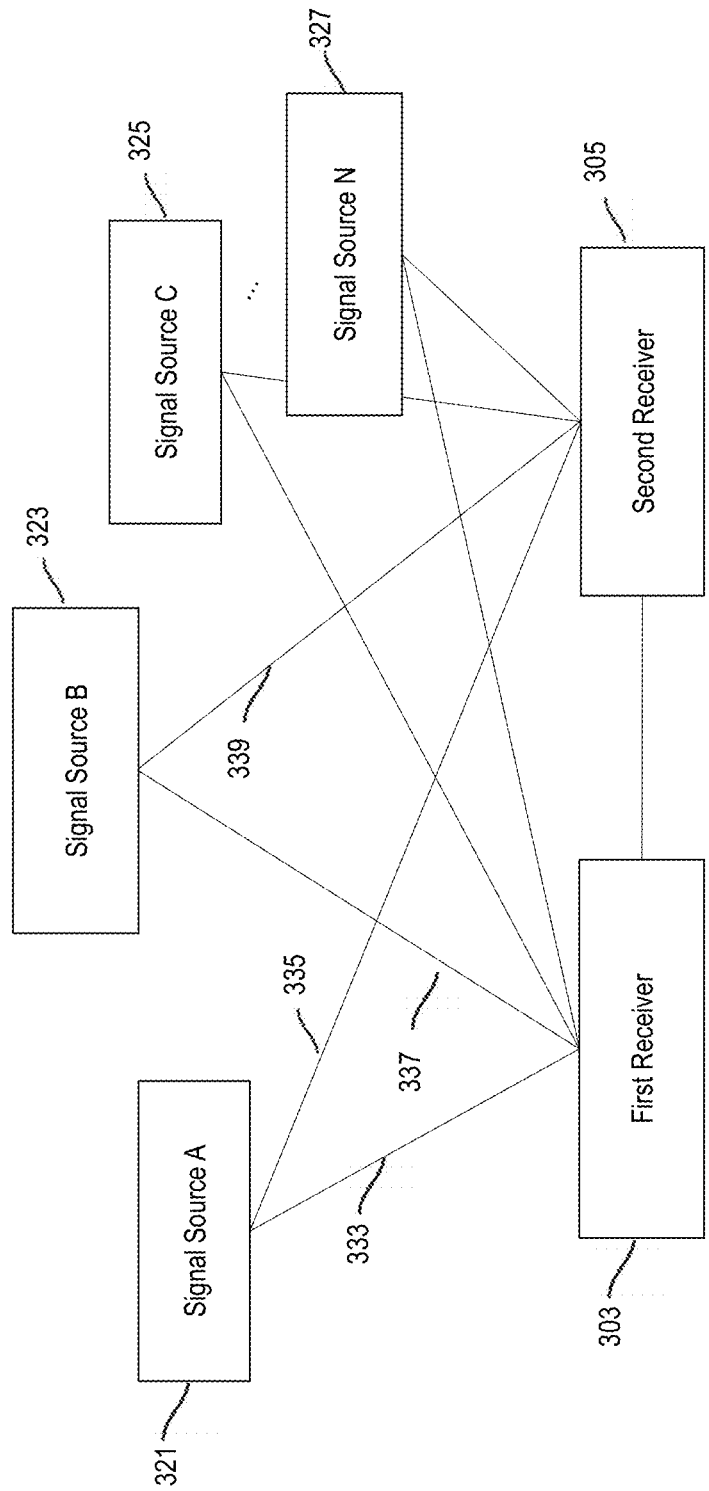
FIG. 3B illustrates an exemplary GPS spoofing detection system according to examples of the disclosure.

In one or more examples, after the second carrier phase data is generated at steps 306, 322, the process 300 can move to step 310 wherein carrier phase differential (CPD) data can be generated. In one or more examples, phase measurements at each receiver can be differenced among two or more signal sources, e.g., satellites or spoofing devices, and the inter-satellite differences can be differenced across the receivers. For example, referring briefly to FIG. 3B, first receiver 303 can receive a signal 333 from signal source A 321, and based on this signal 333, receiver 303 can determine a first carrier phase data. Receiver 303 can also receive a signal 337 from signal source B 323, and based on this signal 337, receiver 303 can determine a second carrier phase data. Similarly, receiver 305 can receive a signal 335 from signal source A 321, and based on this signal 335, receiver 305 can determine a third carrier phase data. Receiver 305 can also receive a signal 339 from signal source B 323, and based on this signal 339, receiver 305 can determine a fourth carrier phase differential data. The carrier phase data can be differenced across signal source, such that the difference between the first and third carrier phase data related to signal source A 321 and the difference between the second and fourth carrier phase data related to signal source B 323 can be determined. The difference related to signal source A 321 can be differenced (e.g., a double difference) with the difference related to signal source B 323 to determine the CPD data. In one or more examples, the double difference measurements can be used to calculate a relative position between the first and second antennas. In one or more examples, the double difference measurements from four or more signal source can be used to calculate a relative position between the first and second antennas. For example, the carrier phase data for three or more other signal sources can be differenced against a reference carrier phase data. For instance, carrier phase data associated with signal source A 321 and signal source B 323 can be differenced, the carrier phase data associated with signal source A 321 and signal source C 325 can be differenced, and the carrier phase data associated with signal source A 321 and signal source N 327 can be differenced. In this manner, the detector can use the carrier phase data to determine the relative position between the first and second antennas. In one or more examples, a general purpose CPD relative positioning algorithm can be used.

Figure 4B:
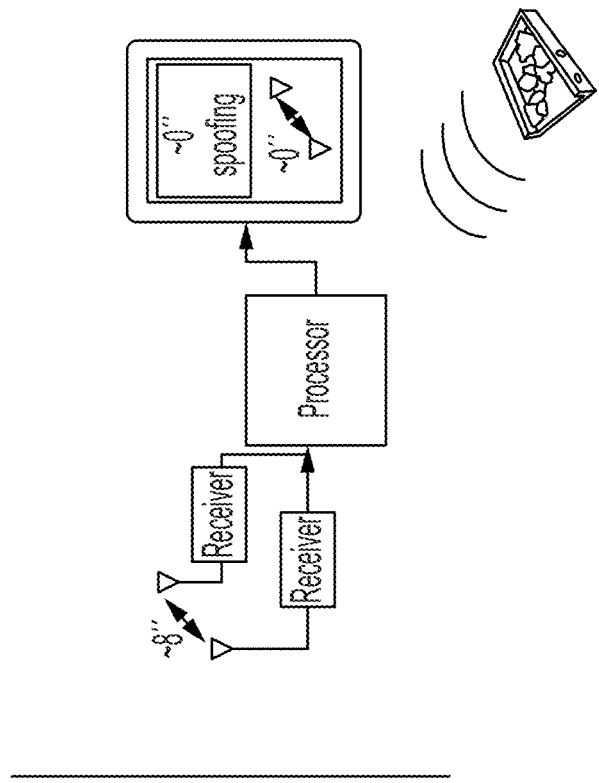
FIGS. 4A-4B illustrate exemplary GPS spoofing detection systems according to examples of the disclosure.
Figure 4A:
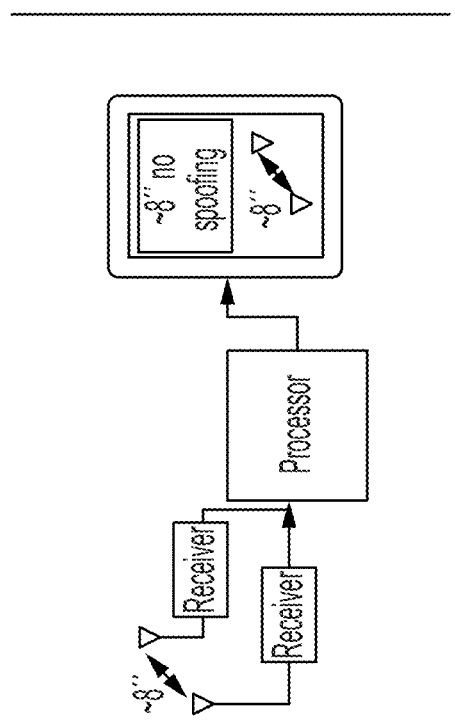

Referring briefly to FIG. 4A, in one or more examples, if the GPS signals received are from a satellite, the generated CPD data generated may correspond to approximately the distance between the two antennas. For instance, if the distance between the first antenna and the second antenna, e.g., relative position, is 8 in., then the CPD data can generate a measured distance value of corresponding to the relative distance between the first antenna and the second antenna, e.g., approximately 8 in. A skilled artisan will understand that the measured distance may depend on the configuration, e.g., distance between, the first antenna and the second antenna. In one or more examples, the relative position can be more or less than 8 in., e.g., 10-6 in. Accordingly, the generated measured distance value may be more or less than 8 in.

Referring to FIG. 4B, if the GPS signals received are from a GPS spoofing device, the generated CPD data can generate a measured distance value that does not correspond to the relative position of the first and second antennas. In one or more examples, if the GPS signals received are from GPS spoofing device, the generated CPD data can generate a measured distance value of approximately 0 in. In one or more examples, the generated CPD data can correspond to a distance greater than or less than the relative distance between the first and second antenna, e.g., greater or less than 8 in.

Referring back to FIG. 3A, in one or more examples, after generating the CPD data at step 310, the process 300 can move to decision 312, wherein the detector compares the CPD data to a predetermined threshold. In one or more examples, the detector can determine whether the CPD data is below a predetermined threshold. In one or more examples, the relative position calculation can use prior information about the distance between the antennas. For example, if the CPD data is below the predetermined threshold then the system may determine that the signals received are from a spoofing device; if the CPD data is not below, e.g., at or above, the predetermined threshold, then the system may determine that the signals received are from actual satellites. The predetermined threshold can be based on an acceptable amount of error in CPD data. For instance, in one or more examples the threshold may be about 2 in. In one or more examples, larger or smaller thresholds, and/or ranges may be used without departing from the scope of this disclosure. In one or more examples, an algorithm can be used to determine the threshold and/or an acceptable range of values, e.g., a minimum viable decision algorithm. In one or more examples, the detector can determine whether the CPD data is above a predetermined threshold and/or within a range of predetermined values.

In one or more examples, if the CPD data is below a predetermined threshold at step 312, the process 300 can move to step 314 wherein an alert can be sent to an external computing device. For instance, if the predetermined threshold value is 2 in. and the generated distance value in step 310 is less than 2 in., the detector can determine that the GPS signals received are false and send an alert to an external computer. In one or more examples, the detector can send an alert to an electronic flight bag (EFB). In one or more examples, the alert may be a pop-up that appears on the display of the external computing device. The alert can include an audio indicator to get the attention of the operator of the aircraft. In one or more examples, the detector can send the alert wirelessly, e.g., via Bluetooth, to the external computing device. In one or more examples, the processor can send the alert via a wired connection. In one or more examples, after the alert is sent at step 314, the process 300 can move to step 316 wherein the process is terminated.

In one or more examples, if the CPD data is not below a predetermined threshold at step 312, the process 300 can move to step 316 wherein the process is terminated. For instance, if the predetermined threshold value is 2 in. and the generated distance value in step 310 is less than 2 in, the detector can determine that the GPS signals received are genuine and can end the process 300. In one or more examples, the detector can send an update to the external computer that it has not detected suspicious GPS signals. For instance, the update can be a pop-up on a display of the external computer.

In one or more examples, a detector, e.g., detector 110, can be used to determine if signals from a GPS spoofing device are being received. In one or more examples, the detector can identify spoofed GPS signals by performing a position, velocity, and/or time (PVT) validation process based on PVT data received by the one or more receivers. In one or more examples, the PVT validation process can compare data received by the one or more receivers to known physical constraints of the vessel, e.g., aircraft, where the detector is located. In one or more examples, the PVT validation process can filter data received by the one or more receivers. In one or more examples, the PVT validation process can monitor accuracy values provided by the receiver.

Figure 5:
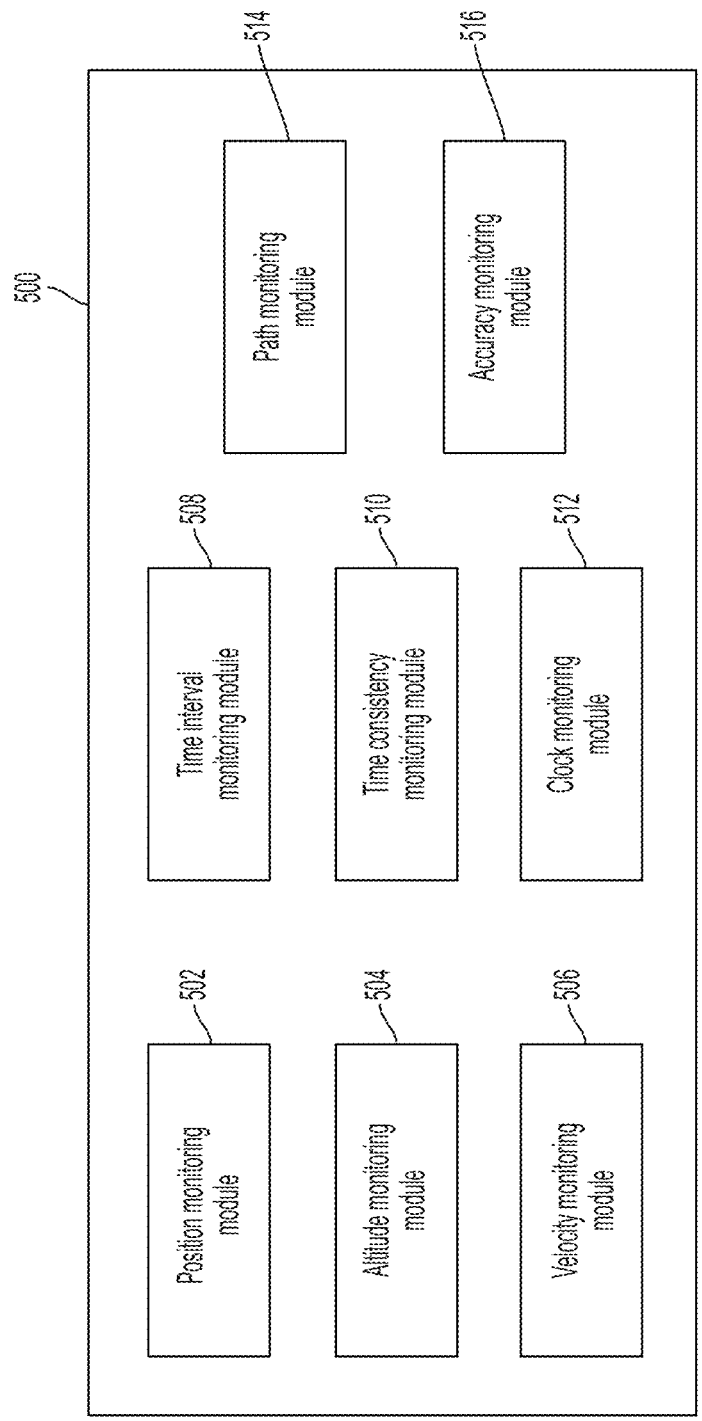
FIG. 5 illustrates a block diagram of an exemplary GPS spoofing detection system according to examples of the disclosure.

In one or more examples the detector can comprise a computing system including one or more modules to perform the PVT validation. FIG. 5 illustrates an exemplary modules of an exemplary GPS spoofing detection system 500. The GPS spoofing detection system 500 can include a position monitoring module 502, an altitude monitoring module 504, a velocity monitoring module 506, a timing interval monitoring module 508, a time consistency monitoring module 510, a clock monitoring module 512, a path monitoring module 514, and a signal accuracy monitoring module 516.

In one or more examples, the position monitoring module 502 can monitor the change in position between two or more successive PVT measurements. The PVT measurements can be based on one or more GPS signals received by the detector. In one or more examples, the position monitoring module 502 can monitor changes in position of the vessel, e.g., an aircraft. If the PVT data indicates that the vessel appears to have a change in position above or below a predetermined threshold, the position monitoring module 502 may determine the received signal was sent from a spoofing device. The predetermined threshold may be based on, for example, a maximum change in position for the vessel that can be determined using empirical data known about the vessel, e.g., maximum speed for a specific payload at a specific altitude. In one or more examples, rather than detecting a spoofed signal when a single PVT measurement exceeds the threshold, there can be a time series condition that can trigger a spoofing detection determination when a predetermined percentage of PVT measurements consecutively exceeds the threshold for a time period. For instance, when the threshold is exceeded n times over N consecutive time steps. In one or more examples, a GPS spoof can be detected when 40% of the values consecutively exceed the threshold in a 5-second time interval. In one or more examples, a GPS spoof can be detected when 60% of the values consecutively exceed the threshold in a 5-second time interval. These examples are not intended to limit the scope can be adjusted as appropriate based on empirical data and/or performance requirements.

In one or more examples, the altitude monitoring module 504 can monitor the change in altitude between two or more successive PVT measurements. In one or more examples, the altitude monitoring module 504 can monitor changes in altitude of the vessel. If the PVT data indicates that the vessel appears to have a change in altitude above a predetermined threshold, the altitude monitoring module 504 may determine the received signal, e.g., used to derive the PVT data, was sent from a spoofing device. The predetermined threshold may be based on, for example, a maximum change in altitude for the vessel that can be determined using empirical data known about the vessel. In one or more examples, rather than detecting a spoofed signal when a single PVT measurement exceeds the threshold, there can be a time series condition that a predetermined percentage of consecutive PVT measurements exceeds the threshold for a time period, as discussed above with respect to module 502.

In one or more examples, the velocity monitoring module 506 can monitor the change in velocity between two or more successive PVT measurements. In one or more examples, the velocity monitoring module 506 can monitor changes in velocity of the vessel. In one or more examples, the velocity monitoring module 506 can monitor a maximum velocity based on, e.g., maximum airspeed and maximum tail wind for the vessel. In some examples, the maximum airspeed and maximum tail wind estimates may be provided by the position monitoring module 502. If the PVT data indicates that the vessel appears to be have a change in velocity and/or a change in maximum velocity above a predetermined threshold, the velocity monitoring module 506 may determine the received signal, e.g., used to derive the PVT data, was sent from a spoofing device. The predetermined threshold may be based on, for example, a maximum change in velocity for the vessel that can be determined using empirical data. In one or more examples, rather than detecting a spoofed signal when a single PVT measurement exceeds the threshold, there can be a time series condition that a predetermined percentage of consecutive PVT measurements exceeds the threshold for a time period, as discussed above.

In one or more examples, the time interval monitoring module 508 can monitor frequency of PVT measurements received by the receivers. In order to provide a dependable operating environment, PVT measurements should be received at regular, consistent intervals. In one or more examples, the PVT measurements can arrive at the receiver every 125 ms. In one or more examples, the PVT measurements can arrive at the receiver at larger or smaller increments, e.g., every 120 ms or 130 ms, and/or the PVT measurements may arrive at the receiver in a range of about, e.g., 120-130 ms, without departing from the scope of this disclosure. Thus, the time interval monitoring module 508 can monitor the time difference between successive PVT measurements. In one or more examples, the detection threshold can be based on assumed and/or measured statistics of PVT measurements. In one or more examples, an acceptable threshold for deviation from the expected time difference can be 10%, e.g., the time interval is expected to be between 112-138 ms. In one or more examples, a spoofed signal can be detected based on a time series condition. For example, rather than detecting a spoofed signal when a single PVT measurement exceeds the threshold, there can be a time series condition that can trigger a spoofing detection determination when a predetermined percentage of PVT measurements consecutively exceeds the threshold for a time period. For instance, when the threshold is exceeded n times over N consecutive time steps. In one or more examples, the threshold value can be adjusted based on the acquired PVT data. For instance, in one or more examples, if the PVT measurements indicates a stable time interval of 125 ms, the threshold can be reduced from 10% to 5%.

In one or more examples, the time consistency monitoring module 510 can monitor the time and date consistency of two or more PVT measurements. In one or more examples, if one or more satellites providing PVT data in a constellation are spoofed, satellites in a different constellation may not be spoofed. Based on this assumption, the time consistency monitoring module 510 can determine timing information for each constellation relative to the PVT measurement. In one or more examples, the upper threshold of an acceptable difference in times between constellations and the PVT measurement can be 10 ns. For instance, if a time delay greater than 10 ns between a constellation and the PVT measurement is detected, the received data from the constellation may be identified as a spoof. In one or more examples, the PVT measurements can arrive at the receiver at larger or smaller increments, e.g., every 8 ns or 12 ns, and/or the PVT measurements may arrive at the receiver in a range of time increments, e.g., 8-12 ns, without departing from the scope of this disclosure. In one or more examples, a spoofed signal can be detected based on a time series condition where n instances of exceeding thresholds in N consecutive time steps.

In one or more examples, the clock monitoring module 512 can monitor the clock bias and clock rate bias values of the GPS. For instance, the clock rate bias values can be associated with a position solution, while the clock bias values can be associated with the velocity solution of the PVT measurements. An inconsistency between the clock rate bias values and the clock bias values and/or the position and velocity solutions can be indicative of receiving one or more spoofed signal. In one or more examples, the inconsistency detection can be based on statistical, deterministic, or empirical models of clock behavior.

Figure 7:
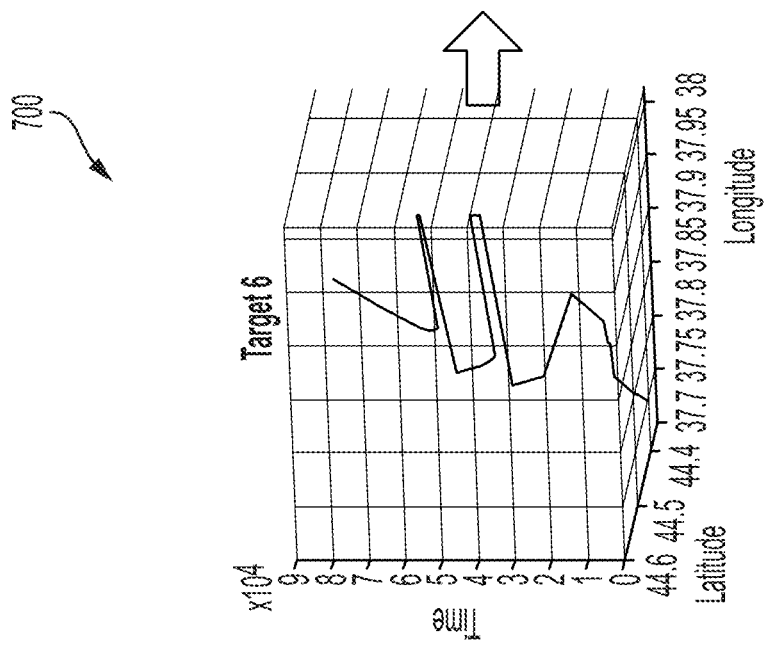
FIG. 7 illustrates a graph of an exemplary determined trajectory of a vessel according to examples of this disclosure.
Figure 6:
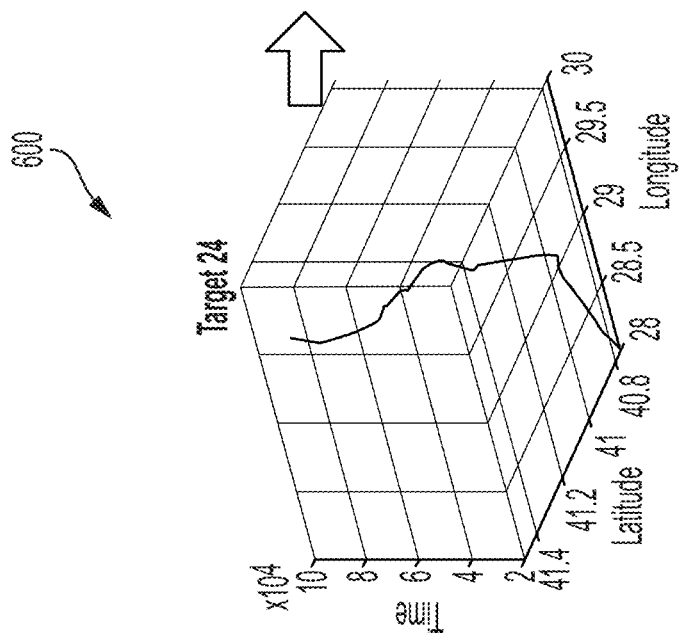
FIG. 6 illustrates a graph of an exemplary determined trajectory of a vessel according to examples of this disclosure.

In one or more examples, the path monitoring module 514 can monitor the path of the vessel based on successive PVT measurements. In one or more examples, the path monitoring module 514 can use a tracking based algorithm, for example, but not limited to the Kalman filter and spectral clustering to monitor the PVT measurements and/or predict a path of the vessel based on previous PVT measurements. Turning briefly to FIG. 6, graph 600 illustrates an exemplary vessel path where there is no spoofed data according to one or more examples. Referring briefly to FIG. 7, graph 700 illustrates an exemplary vessel path with spoofed data, according to one or more examples. As seen in the figure, there are a few areas where the graph 700 "jumps." These jumps in data can be indicative of spoofed data. In one or more examples, the path monitoring module 514 can use filtering and/or other algorithms to identify spoofed data.

In one or more examples, the time accuracy monitoring module 516 can monitor the accuracy estimates associated with successive PVT measurements. In one or more examples, the receiver can provide accuracy estimates for one or more PVT measurements. These accuracy estimates can be indicative of a spoofed GPS signal, for example, when accuracy values are relatively low and/or relatively high. For instance, in one or more examples, relatively low accuracy estimates may be associated with a GPS spoofing device overpowering GPS signals. In one or more examples, relatively high accuracy estimates may be associated with a GPS spoofing device providing false GPS signals that are inconsistent with GPS signals being received from other satellites. In one or more examples, acceptable variance in the accuracy estimates may be determined from observational and/or statistical data. In one or more examples, a spoofed signal can be detected based on a time series condition as discussed above. For example, rather than detecting a spoofed signal when a single PVT measurement exceeds the threshold, there can be a time series condition that can trigger a spoofing detection determination when a predetermined percentage of PVT measurements consecutively exceeds the threshold for a time period. For instance, when the threshold is exceeded n times in an interval of N consecutive time steps.

In one or more examples, some of the modules of spoofing detection system 500 can be optional and/or additional modules can be included in the system 500. Each of the modules can be implemented in either software, hardware or both. In one or more examples the modules of spoofing detection system 500 can be software modules. In one or more examples the modules of spoofing detection system 500 can comprise hardware and software elements of an ASIC, such as a system-on-a-chip, for performing the functions described above.

Figure 8:
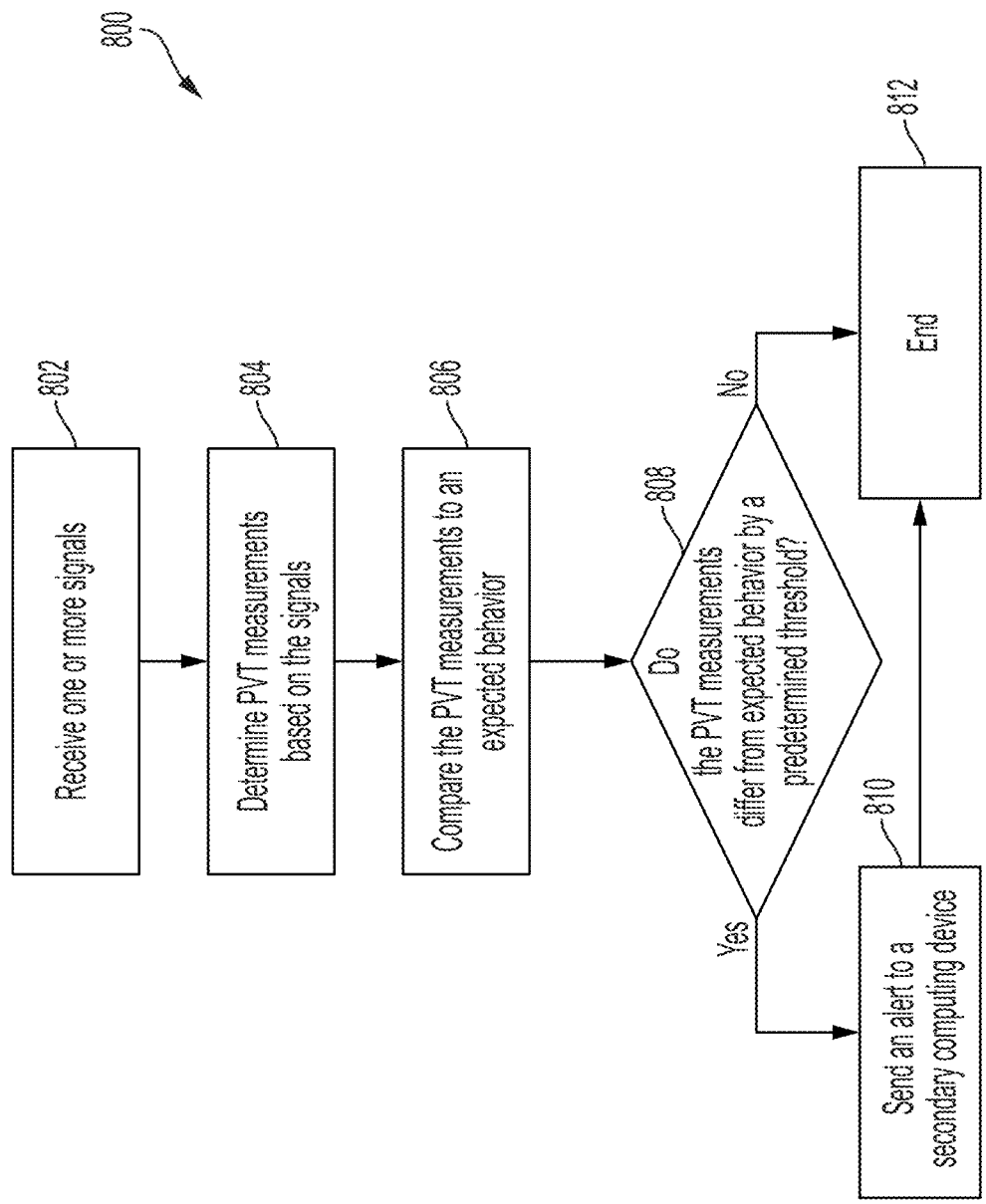
FIG. 8 illustrates an exemplary GPS spoofing detection process according to examples of the disclosure.

FIG. 8 illustrates an exemplary spoofing detection process according to examples of the disclosure. In one or more examples, one or more steps of process 800 can be implemented on a computing system according to embodiments of this disclosure. In one or more examples of the disclosure, the process 800 depicted in FIG. 8 can begin at step 802 wherein the detector receives one or more signals. For instance, the antennas of the detector can receive the one or more signals. In one or more examples, after receiving the signals at step 802, the process can move to step 804 wherein PVT measurements can be determined. In one or more examples, the detector can determine the PVT measurements at the receiver. For example, the receiver can determine the PVT measurements.

In one or more examples, after the receiver determines the PVT measurements at step 804, the process can move to step 806 wherein the PVT measurements can be compared to an expected behavior. In one or more examples, step 806 can be performed by one or more of the modules 502-516 described above. For instance, in one or more examples, the expected behavior can correspond to one or more of an expected change in position, an expected change in altitude, an expected change in velocity, an expected time interval, an expected time consistency, an expected clock rate bias, an expected path, and an expected level of accuracy. In one or more examples, the expected behavior can be based on the one or more of the historical behavior of the vessel, physical characteristics of the vessel, timing characteristics of the spoofing detector, timing characteristics of the one or more satellites, and/or historical calculations, e.g., accuracy calculations, of the detector, as discussed above with respect to system 500. In one or more examples, the historical behavior can include a flight path trajectory of the vessel on a current trip. In one or more examples, the historical calculations of the detector can include calculations performed by the detector on a current trip and/or any previous calculations performed by the detector, for example, previous calculations performed for prior trips.

In one or more examples, after comparing the PVT measurements to the expected behavior at step 806, the process can move to decision 808 wherein whether the PVT measurements differ from expected behavior by a predetermined threshold can be determined. As discussed above, the predetermined threshold can be based on empirical data associated with a particular vessel. If the PVT measurements differ from expected behavior by a predetermined threshold at decision 808, then the process can move to step 810, wherein an alert can be sent to an external computing device. In one or more examples, the alert may be triggered if a time series condition is met, such that the threshold is exceeded n times over N consecutive time steps. In one or more examples, after the alert is sent at step 810, the process 800 can move to step 812 wherein the process is terminated.

In one or more examples, if the detector determines that the PVT measurements do not differ from expected behavior by a predetermined threshold at step 808, the process 800 can move to step 812 wherein the process is terminated.

In one or more examples, a detector, e.g., detector 110, can implement one or more processes to determine if signals from a GPS spoofing device are being received. In one or more examples, the detector can identify spoofed GPS signals based on an input data validation process. For instance, the input data validation process can use validation constraints to identify data from a GPS spoofing device and can provide confirmation that data transmitted to the receiver comply with one or more validation constraints, e.g., constraints provided by the list of allowed values and/or allow list constraints. As used herein, list of allowed values can refer to values and/or behaviors (in time and/or state) of acceptable input data found in one or more data frames of a received signal. For example, the list of allowed values can include a list of words or combinations of words that are acceptable in one or more data frames of a received signal. In one or more examples, the list of allowed values can be generated from publicly available validity checks, statistical behavior of historical messages, rules to detect specific spoofing threats, or other data reasonableness checks.

In one or more examples, when input data fall within expected bounds or behave in an expected manner, the application of the list of allowed values can help prevent failures during software execution resulting from improper input data, and can do so without explicitly identifying the mode of failure. Because the list of allowed values do not identify failure modes, the list of allowed values may be updated relatively infrequently, e.g., when new failure modes are revealed, the set of rules changes, and/or new parameters are added.

Figure 9:
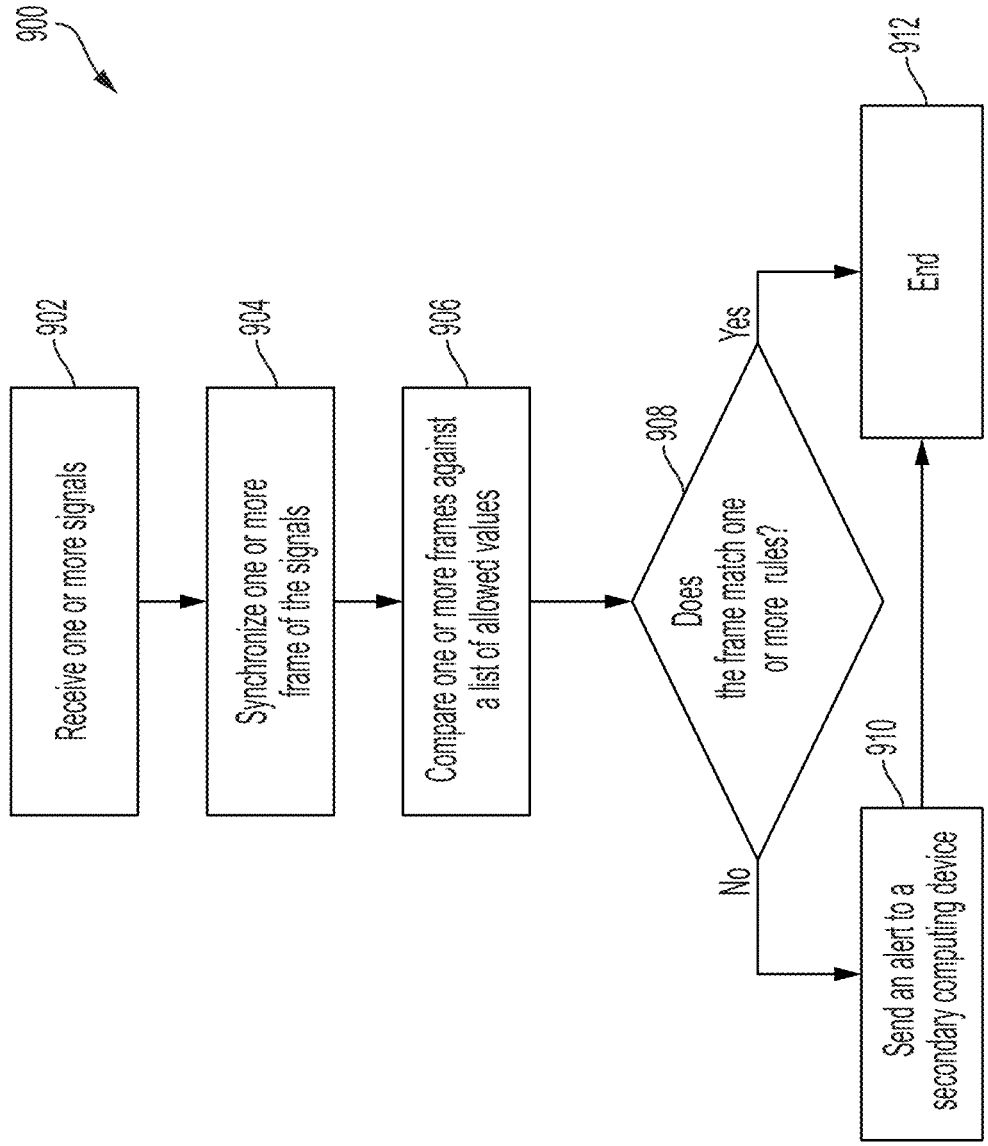
FIG. 9 illustrates an exemplary GPS spoofing detection process according to examples of the disclosure.

FIG. 9 illustrates an exemplary spoofing detection process according to examples of the disclosure. In one or more examples, one or more steps of process 900 can be implemented on a computing system according to embodiments of this disclosure. In one or more examples of the disclosure, the process 900 depicted in FIG. 9 can begin at step 902 wherein the detector receives one or more signals. The detector can receive the one or more signals at the first antenna and/or a second antenna. As discussed above, the antennas can transmit the signal to a corresponding receiver. The one or more signals can include frames of data received from one or more satellites. In one or more examples, each frame can have 5 subframes, and each subframe can have 30 words. In one or more examples, the list of allowed values can include individual words and possibly combinations of words. In one or more examples, each word is made up of 24 data bit and 6 parity bits.

In one or more examples, after the signals are received at step 902, the process 900 can move to step 904 wherein the frames of the signal are synchronized. For example, signals received from the one or more satellites may be convolutionally encoded such that the beginning of each frame includes bits, e.g., the last six bits of the previous frame. Due to the convolutional encoding, encoding and/or decoding delays, and/or transmission delays, it can be desirable to synchronize each frame to the corresponding satellite clock. In one or more examples, the beginning of the first symbol that contains any information about the first bit of a frame will be synchronized to every eighth second of the corresponding satellite clock. In one or more examples, the detector can include convolutional decoders that can introduce a fixed delay based on its respective algorithms to determine system time from the received signal. In one or more examples, the receiver of the detector can synchronize the frames of the signal. By synchronizing the frames, the receiver can determine which frame it is processing and can identify the data associated with the synchronized frame.

In one or more examples, after the frames of the signal are synchronized at step 904, the process 900 can move to step 906 wherein the words included in one or more subframes of a corresponding data frame are compared to the list of allowed values. As discussed above, the list of allowed values can include a list of words or combination of words that define time and/or state values and behaviors of acceptable, e.g., expected input data. In one or more examples, the list of allowed values can be created from publicly available validity checks, statistical behavior of historical messages, rules to detect specific spoofing threats, or other data reasonableness checks. In one or more examples, the detector can select one or more words included in one or more subframes of a corresponding data frame and compare the selected one or more words against the list of allowed values. In one or more examples, comparing the one or more words to the list of allowed values can include performing a bit-wise error check. In one or more examples a header packet can be compared to the list of allowed values.

In one or more examples, after the one or more words included in one or more subframes of a corresponding data frame are compared to the list of allowed values at step 906, the process 900 can move to decision 908 wherein it is determined whether the one or more words matches values of the list of allowed values is determined. In one or more examples, if the detector determines that the selected one or more words do not match the list of allowed values, the process 900 can move to step 910, wherein the detector can send an alert to an external computing device, e.g., an electronic flight bag. In one or more examples, determining that the one or more words do not match the list of allowed values can be indicative of a spoofing event. In one or more examples, determining that the one or more words do not match the list of allowed values may be not be due to spoofing, but rather caused by noise, a frame mismatch, one or more satellite errors, and/or human error. Thus, process 900 may be used to check the integrity of the data received by the detector and the alert can indicate that the signals received may have an error.

In one or more examples, if the detector determines that the one or more words match one or more values of the list of allowed values at step 908, the process 900 can move to step 912 wherein the process can terminate. In one or more examples, determining that the selected frame matches one or more values of the list of allowed values can indicate that the data contained in the corresponding signal is genuine and not sent by a spoofing detector. In one or more examples, a spoofing detector and/or malicious actor may have knowledge of one or more rules included in the list of allowed values. In such examples, determining that the one or more words match one or more values of the list of allowed values may not conclusively indicate that the corresponding signal is genuine.

As discussed above, the results of process 900 can be indicative of receiving a spoofed signal, but may not conclusively determine whether a signal is spoofed. Thus, in one or more examples, it can be advantageous to pair process 900 with one or more other processes for detecting spoofing events as described herein.

In one or more examples, the processes for identifying a spoofed GPS signal, e.g., one or more steps of process 300, process 800, and process 900 can run in parallel. In such examples, if two or more of the processes determine that one or more of the received signals has been spoofed, it may be determined that the received signal is spoofed. In one or more examples, the processes 300, 800, and 900 described can be used in tandem, such that determining that one or more of the received signals was spoofed via a first process can trigger the system to perform a second process to confirm receipt of one or more spoofed signals.

Figure 10:
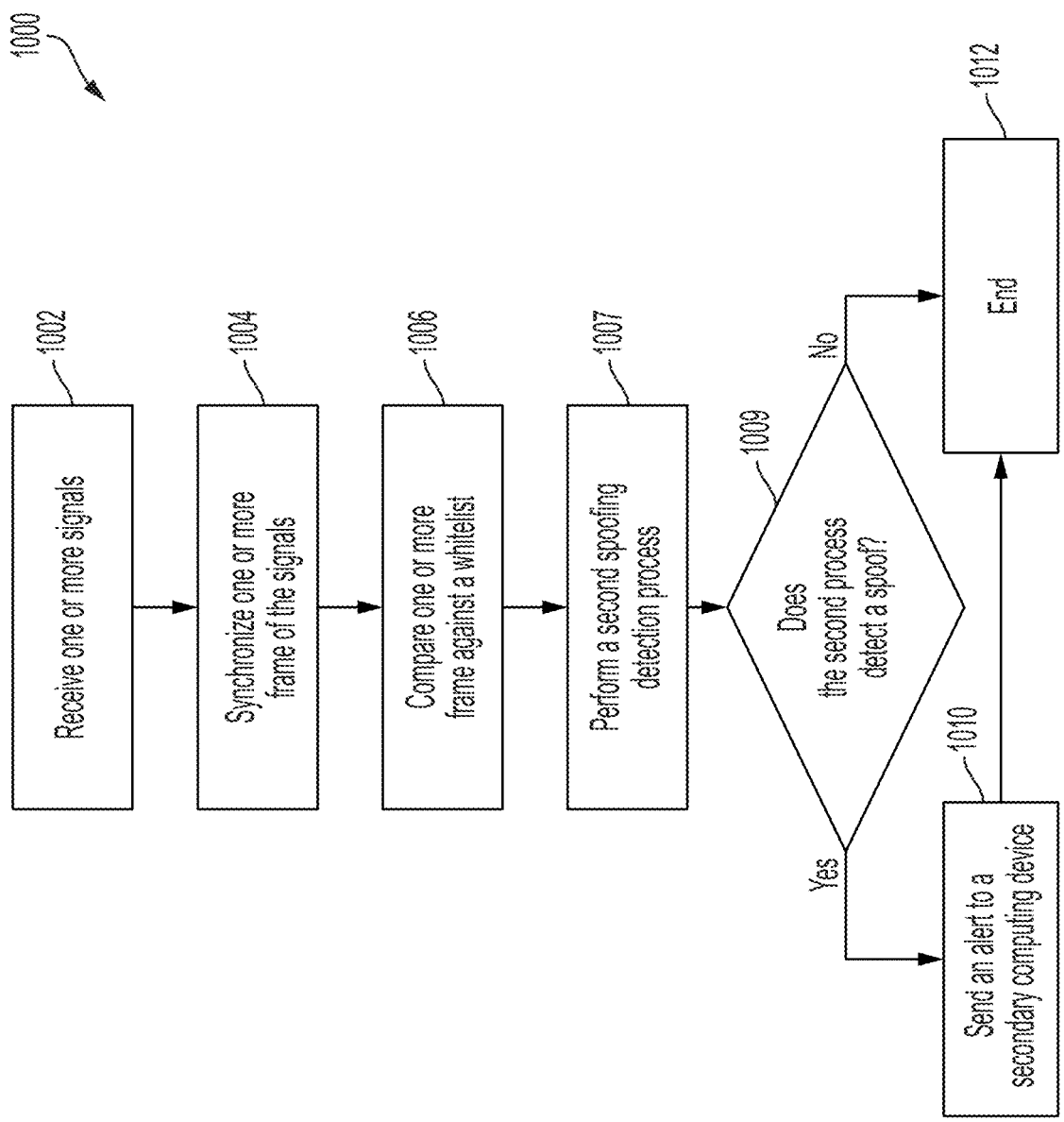
FIG. 10 illustrates an exemplary GPS spoofing detection process according to examples of the disclosure.

For instance, in one or more examples, FIG. 10 illustrates an exemplary spoofing detection process according to examples of the disclosure where the process 900 can be used in tandem with one or more processes for detecting GPS spoofing. In one or more examples, one or more steps of process 1000 can be implemented on a computing system according to embodiments of this disclosure. In one or more examples of the disclosure, the process 1000 depicted in FIG. 10 can begin at step 1002 wherein the detector receives one or more GPS signals. In one or more examples, after the GPS signals are received at step 1002, the process 1000 can move to step 1004 wherein the frames of the GPS signal are synchronized. In one or more examples, after the frames of the GPS signal are synchronized at step 1004, the process 1000 can move to step 1006 wherein the one or more synchronized frames are compared to one or more values of the list of allowed values. In one or more examples, step 1002-1006 can be substantially similar to steps 902-906 discussed above.

In one or more examples, after the frames are compared to the list of allowed values at step 1006, the process 1000 can move to step 1007 wherein a second spoofing detection process can be performed. In one or more examples, the second spoofing detection process can include, for example process 300 and/or process 800. In one or more examples, a third spoofing detection process can also be performed, e.g., such that both process 300 and 800 are performed. Performing a second and/or third spoofing detection process can improve a level of certainty that a GPS spoof has been detected before sending an alert to an external computing device.

In one or more examples, after performing the second spoofing detection process at step 1007, the process 1000 can move to decision 1009 wherein whether the second process detected a spoof is determined. In one or more examples, if a spoofed GPS signal is detected at decision 1009, the process 1000 can move to step 1010, wherein an alert to an external computing device is sent. The alert can indicate that a GPS spoofing signal was detected. In one or more examples, if the selected frame matched one or more values of the list of allowed values at step 1006, the alert may further include a warning that the GPS spoofing device may have knowledge of one or more of the values of the list of allowed values. This can provide situational and/or operational awareness that the malicious actor may have knowledge of the allowed values. In one or more examples, if a spoofed GPS signal was not detected at decision 1009, the process 1000 can move to step 1012 wherein the process can terminate. In one or more examples, if the selected frame did not match the list of allowed values at step 1006, an alert may be sent to the external computing device that the signals may include data errors.

Although FIG. 10 is shown with process 900 triggering the system to perform a second, different process, this is not intended to limit the scope of the disclosure. For instance, in one or more examples determining that one or more of the received signals was spoofed via a process 300 can trigger the system to perform a second process, e.g., one or more of processes 800 and 900. For instance, in one or more examples determining that one or more of the received signals was spoofed via a process 800 can trigger the system to perform a second process, e.g., one or more of processes 300 and 900. In one or more examples, determining that one or more of the received signals was spoofed via the second process, e.g., one or more of process 300 and 900, can trigger the system to perform a third process, e.g., one or more of processes 300 and 900. In one or more examples, one or more of the processes 300, 800, and 900 can run continuously. In one or more examples, one or more of the processes 300, 800, and 900 can be performed on demand and/or at specified intervals.

Figure 11:
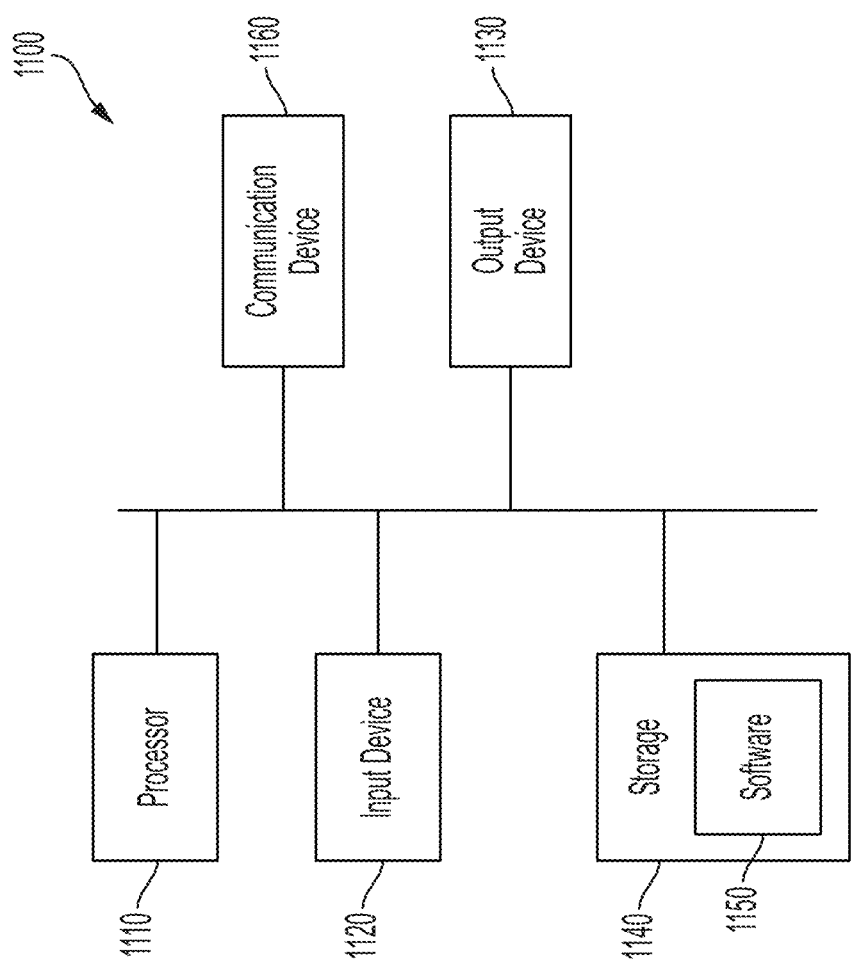
FIG. 11 illustrates an exemplary computing system, according to examples of the disclosure.

FIG. 11 illustrates an example of a computing system 1100, in accordance one or more examples of the disclosure. System 1100 can be a client or a server. As shown in FIG. 11, system 1100 can be any suitable type of processor-based system, such as a personal computer, workstation, server, handheld computing device (portable electronic device) such as a phone or tablet, or dedicated device. The system 1100 can include, for example, one or more of input device 1120, output device 1130, one or more processors 1110, storage 1140, and communication device 1160. Input device 1120 and output device 1130 can generally correspond to those described above and can either be connectable or integrated with the computer.

Input device 1120 can be any suitable device that provides input, such as a touch screen, keyboard or keypad, mouse, gesture recognition component of a virtual/augmented reality system, or voice-recognition device. Output device 1130 can be or include any suitable device that provides output, such as a display, touch screen, haptics device, virtual/augmented reality display, or speaker.

Storage 1140 can be any suitable device that provides storage, such as an electrical, magnetic, or optical memory including a RAM, cache, hard drive, removable storage disk, or other non-transitory computer readable medium. Communication device 1160 can include any suitable device capable of transmitting and receiving signals over a network, such as a network interface chip or device. The components of the computing system 1100 can be connected in any suitable manner, such as via a physical bus or wirelessly.

Processor(s) 1110 can be any suitable processor or combination of processors, including any of, or any combination of, a central processing unit (CPU), field programmable gate array (FPGA), and application-specific integrated circuit (ASIC). Software 1150, which can be stored in storage 1140 and executed by one or more processors 1110, can include, for example, the programming that embodies the functionality or portions of the functionality of the present disclosure (e.g., as embodied in the devices as described above). For example, software 1150 can include one or more programs for performing one or more of the steps of method 300, method 800, method 900, and/or method 1000.

Software 1150 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1140, that can contain or store programming for use by or in connection with an instruction execution system, apparatus, or device.

Software 1150 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as local networks within the aircraft (e.g., ethernet, wireless, or 1553) or external networks, e.g., wireless network connections, 4G, 5G, T1 or T3 lines, cable networks, DSL, telephone lines or other commercial wireless networks.

System 1100 can implement any operating system suitable for operating on the network. Software 1150 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for detecting a spoofed signal, the spoofed signal comprising position-navigation-timing (PNT) data, the system comprising:

a first antenna configured to receive one or more first signals from one or more navigation satellites;

a second antenna configured to receive one or more second signals from the one or more navigation satellites, wherein the second antenna is separated from the first antenna by a distance;

a first receiver coupled to the first antenna, wherein the first receiver is configured to receive the one or more first signals from the first antenna and wherein the first receiver is configured to extract a first carrier phase data;

a second receiver coupled to the second antenna, wherein the second receiver is configured to receive the one or more second signals from the second antenna and wherein the second receiver is configured to extract a second carrier phase data;

a memory; and one or more processors coupled to the first receiver and the second receiver;

wherein the memory stores one or more programs that when executed by the one or more processors, cause the one or more processors to:

determine a presence of a spoofed signal among the one or more first signals and the one or more second signals, wherein the presence is determined based on the first carrier phase data, the second carrier phase data, and the first distance between the first antenna and the second antenna;

synchronize one or more data frames from at least one of the one or more first signals or the one or more second signals;

compare the one or more data frames to a predetermined list of allowed values; and confirm a spoofed signal among the at least one of the one or more first signals and the one or more second signals, based on the comparison.

2. The system of claim 1, wherein determining the presence of a spoofed signal further comprises:

extracting a third carrier phase data with the first receiver based on the one or more first signals;

extracting a fourth carrier phase data with the second receiver based on the one or more second signals;

determining a first difference between the first carrier phase data and the third carrier phase data;

determining a second difference between the second carrier phase data and the fourth carrier phase data;

determining a double difference between the first difference and the second difference, wherein the double difference corresponds to the carrier phase differential data.

3. The system of claim 1, wherein the processor is caused to send an alert to an external computing device.

4. The system of claim 1, wherein the processor is caused to:

extract a position-velocity-time (PVT) data from at least one of the one or more first signals or the one or more second signals; and determine a presence of a spoofed signal among the at least one of the one or more first signals and the one or more second signals, based on the extracted PVT data.

5. The system of claim 4, wherein determining the presence of a spoofed signal comprises:

determining a signal-based behavior of the system based on the PVT data;

comparing the signal-based behavior of the system to an expected behavior of the system; and determining that the signal-based behavior differs from the expected behavior by a pre-determined threshold.

6. The system of claim 5, wherein the expected behavior comprises at least one selected from an expected change in position, an expected change in altitude, an expected change in velocity, an expected time interval, an expected time consistency, an expected clock rate bias, an expected path, and an expected level of accuracy.

7. The system of claim 6, wherein the expected behavior is based on empirical data comprising one or more selected from a historical trajectory of a vessel carrying the system, physical capabilities of the vessel, timing characteristics of the system, timing characteristics of the one or more navigation satellites, historical accuracies of calculations of the system, and historical accuracies of calculations received by the system.

8. The system of claim 1, wherein the predetermined list of allowed values is generated based on one or more of publicly available validity checks, statistical behavior of historical messages, rules to detect specific spoofing threats, prior knowledge of system design, and data reasonableness checks.

9. The system of claim 1, wherein the first antenna and the second antenna are configured to be mounted to a window.

10. The system of claim 1 further comprising:

a housing, wherein the housing is configured to enclose the first and second receivers;

a first grounding plane, wherein the first grounding plane is disposed between the first antenna and an outer surface of the housing; and a second grounding plane, wherein the second grounding plane is disposed between the second antenna and the outer surface of the housing.

11. The system of claim 10, wherein the housing is configured to be portable, such that the housing can fit on a seat of a vessel.

12. The system of claim 1, wherein the distance between the first antenna and the second antenna is in a range of 6-15 inches.

13. The system of claim 1, wherein the first receiver and the second receiver comprise GNSS receivers.

14. A method for detecting a spoofed signal, the spoofed signal comprising position-navigation-timing (PNT) data, the method comprising:

receiving one or more first signals from one or more navigation satellites at a first antenna;

receiving one or more second signals from the one or more navigation satellites at a second antenna, wherein the second antenna is separated from the first antenna by a first distance;

receiving the one or more first signals at a first receiver coupled to the first antenna, wherein the first receiver is configured to extract a first carrier phase data from the one or more first signals;

receiving the one or more second signals at a second receiver coupled to the second antenna, wherein the second receiver is configured to extract a second carrier phase data from the one or more second signals;

determining a presence of a spoofed signal among the one or more first signals and the one or more second signals, wherein the presence is determined based on the first carrier phase data, the second carrier phase data, and the first distance between the first antenna and the second antenna;

synchronizing one or more data frames from at least one of the one or more first signals or the one or more second signals;

comparing the one or more data frames to a predetermined list of allowed values; and confirming a presence of a spoofed signal among the at least one of the one or more first signals and the one or more second signals, based on the comparison.

15. The method of claim 14, wherein determining the presence of a spoofed signal further comprises:
    extracting a third carrier phase data with the first receiver based on the one or more first signals;
    extracting a fourth carrier phase data with the second receiver based on the one or more second signals;
    determining a first difference between the first carrier phase data and the third carrier phase data;
    determining a second difference between the second carrier phase data and the fourth carrier phase data;
    determining a double difference between the first difference and the second difference, wherein the double difference corresponds to the carrier phase differential data.

16. The method of claim 14, comprising sending an alert to an external computing device.

17. The method of claim 14, comprising:
    extracting a position-velocity-time (PVT) data from at least one of the one or more first signals or the one or more second signals; and
    determining a presence of a spoofed signal among the at least one of the one or more first signals and the one or more second signals, based on the extracted PVT data.

18. The method of claim 17, wherein determining the presence of a spoofed signal comprises:
    determining a signal-based behavior of the system based on the PVT data;
    comparing the signal-based behavior of the system to an expected behavior of the system; and
    determining that the signal-based behavior differs from the expected behavior by a pre-determined threshold.

19. The method of claim 18, wherein the expected behavior comprises at least one selected from an expected change in position, an expected change in altitude, an expected change in velocity, an expected time interval, an expected time consistency, an expected clock rate bias, an expected path, and an expected level of accuracy.

20. The method of claim 19, wherein the expected behavior is based on empirical data comprising one or more selected from a historical trajectory of a vessel carrying the system, physical capabilities of the vessel, timing characteristics of the system, timing characteristics of one or more satellites, historical accuracies of calculations of the system, and historical accuracies of calculations received by the system.

21. The method of claim 14, wherein the predetermined list of allowed values is generated based on one or more of publicly available validity checks, statistical behavior of historical messages, rules to detect specific spoofing threats, prior knowledge of system design, and reasonableness checks.

22. The method of claim 14, comprising mounting the first antenna and the second antenna to a window.

23. A non-transitory computer readable storage medium storing one or more programs for detecting a spoofed signal, the spoofed signal comprising position-navigation-timing (PNT) data, for execution by one or more processors of an electronic device that when executed by the device, cause the device to:
    receive one or more first signals from one or more navigation satellites at a first antenna;
    receive one or more second signals from the one or more navigation satellites at a second antenna, wherein the second antenna is separated from the first antenna by a distance;
    receive the one or more first signals at a first receiver coupled to the first antenna, wherein the first receiver is configured to extract a first carrier phase data from the one or more first signals;
    receive the one or more second signals at a second receiver coupled to the second antenna, wherein the second receiver is configured to extract a second carrier phase data from the one or more second signals;
    determine a presence of a spoofed signal among the one or more first signals and the one or more second signals, wherein the presence is determined based on the first carrier phase data, the second carrier phase data, and the first distance between the first antenna and the second antenna;
    synchronize one or more data frames from at least one of the one or more first signals or the one or more second signals;
    compare the one or more data frames to a predetermined list of allowed values; and
    confirm a spoofed signal among the at least one of the one or more first signals and the one or more second signals, based on the comparison.

24. The non-transitory computer readable storage medium of claim 23, wherein determining the presence of a spoofed signal further comprises:
    extracting a third carrier phase data with the first receiver based the on one or more first signals;
    extracting a fourth carrier phase data with the second receiver based on the one or more second signals;
    determining a first difference between the first carrier phase data and the third carrier phase data;
    determining a second difference between the second carrier phase data and the fourth carrier phase data;
    determining a double difference between the first difference and the second difference, wherein the double difference corresponds to the carrier phase differential data.

25. The non-transitory computer readable storage medium of claim 23, caused to send an alert to an external computing device.

26. The non-transitory computer readable storage medium of claim 23, caused to:
    extract a position-velocity-time (PVT) data from at least one of the one or more first signals or the one or more second signals; and
    determine a presence of a spoofed signal among the at least one of the one or more first signals and the one or more second signals, based on the extracted PVT data.

27. The non-transitory computer readable storage medium of claim 26, wherein determining the presence of a spoofed signal comprises:
    determining a signal-based behavior of the system based on the PVT data;
    comparing the signal-based behavior of the system to an expected behavior of the system; and
    determining that the signal-based behavior differs from the expected behavior by a pre-determined threshold.

28. The non-transitory computer readable storage medium of claim 27, wherein the expected behavior comprises at least one selected from an expected change in position, an expected change in altitude, an expected change in velocity, an expected time interval, an expected time consistency, an expected clock rate bias, an expected path, and an expected level of accuracy.

29. The non-transitory computer readable storage medium of claim 28, wherein the expected behavior is based on empirical data comprising one or more selected from a historical trajectory of a vessel carrying the system, physical capabilities of the vessel, timing characteristics of the system, timing characteristics of one or more satellites, historical accuracies of calculations of the system, and historical accuracies of calculations received by the system.

30. The non-transitory computer readable storage medium of claim 29, wherein the predetermined list of allowed values is generated based on one or more of publicly available validity checks, statistical behavior of historical messages, rules to detect specific spoofing threats, prior knowledge of system design, and data reasonableness checks.

31. The system of claim 1, wherein the one or more data frames from at least one of the one or more first signals or the one or more second signals are synchronized to a satellite clock of the one or more navigation satellites.

* * * * *